(12) United States Patent
Evans, V et al.

(10) Patent No.: US 10,271,189 B2
(45) Date of Patent: *Apr. 23, 2019

(54) COMMUNICATION BETWEEN DEVICES AND DEVICE ACCESSORIES

(71) Applicant: Essential Products, Inc., Palo Alto, CA (US)

(72) Inventors: David John Evans, V, Palo Alto, CA (US); Joseph Anthony Tate, San Jose, CA (US); Jason Sean Gagne-Keats, Cupertino, CA (US); William Francis Leggett, San Jose, CA (US); James Jong-sik Kim, San Jose, CA (US); Rebecca Schultz Zavin, Portola Valley, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,581

(22) Filed: Feb. 24, 2017

(65) Prior Publication Data

US 2017/0353821 A1 Dec. 7, 2017

Related U.S. Application Data

(60) Provisional application No. 62/344,070, filed on Jun. 1, 2016, provisional application No. 62/457,129, filed
(Continued)

(51) Int. Cl.
*H04W 4/80* (2018.01)
*H02J 50/00* (2016.01)

(52) U.S. Cl.
CPC .............. *H04W 4/80* (2018.02); *H02J 50/00* (2016.02)

(58) Field of Classification Search
CPC ................................ H04W 4/005; H02J 50/12
See application file for complete search history.

(56) References Cited

U.S. PATENT DOCUMENTS

| 7,010,332 B1 | 3/2006 | Irvin et al. |
| 8,150,460 B1 | 4/2012 | Curtis et al. |

(Continued)

FOREIGN PATENT DOCUMENTS

| DE | 202016006358 | 3/2017 |
| EP | 2654214 B1 | 5/2016 |
| WO | 2015117536 A1 | 8/2015 |

OTHER PUBLICATIONS

Non-Final Office Action dated Jun. 27, 2017 in U.S. Appl. No. 15/444,243 of Evans et al. filed Feb. 27, 2017; 32 pages.
(Continued)

*Primary Examiner* — Zhitong Chen
(74) *Attorney, Agent, or Firm* — Perkins Coie LLP

(57) ABSTRACT

Various embodiments include a device that implements a high bandwidth wireless data interface for communication between the device and a device accessory. The device can include an external shell and a display (e.g., a touchscreen). In some embodiments, the external shell and the display together hermetically seal various other components of the device. In various embodiments, the device includes an attachment mechanism, an alignment mechanism (e.g., for magnetic alignment between a device and a device accessory), a wireless data transceiver, and a wired or wireless energy source (e.g., for sharing power between the device and the device accessory). The wireless data transceiver can transmit data at extremely high electromagnetic frequencies between the device in the device accessory.

27 Claims, 19 Drawing Sheets

Related U.S. Application Data on Feb. 9, 2017, provisional application No. 62/457,563, filed on Feb. 10, 2017.

(56) References Cited

U.S. PATENT DOCUMENTS

| | | | |
|---|---|---|---|
| 8,390,412 | B2 | 3/2013 | Lauder et al. |
| 8,390,413 | B2 | 3/2013 | Lauder et al. |
| 2007/0281660 | A1 | 12/2007 | Chon |
| 2010/0020983 | A1 | 1/2010 | Waites |
| 2010/0277304 | A1* | 11/2010 | Haartsen ............... G06F 1/3215 340/531 |
| 2011/0191988 | A1 | 8/2011 | Wein et al. |
| 2011/0192857 | A1 | 8/2011 | Rothbaum et al. |
| 2012/0176249 | A1 | 7/2012 | Chatterjee et al. |
| 2013/0241735 | A1 | 9/2013 | Nylen |
| 2013/0303000 | A1 | 11/2013 | Witter et al. |
| 2014/0035523 | A1 | 2/2014 | Winget et al. |
| 2014/0059264 | A1* | 2/2014 | Sudak ................... H04W 4/008 710/303 |
| 2014/0125276 | A1* | 5/2014 | Lampinen ............... H02J 5/005 320/108 |
| 2015/0008875 | A1 | 1/2015 | Huang et al. |
| 2015/0028802 | A1* | 1/2015 | Lee ......................... H02J 7/025 320/108 |
| 2015/0222981 | A1 | 8/2015 | Pegg et al. |
| 2015/0281413 | A1* | 10/2015 | Longo ................. H04M 1/0212 455/575.3 |
| 2015/0373443 | A1 | 12/2015 | Carroll |
| 2015/0373448 | A1 | 12/2015 | Shaffer |
| 2016/0065261 | A1 | 3/2016 | Chen et al. |
| 2016/0259734 | A1 | 9/2016 | Breiwa et al. |
| 2017/0104355 | A1 | 4/2017 | Barmoav et al. |
| 2017/0110787 | A1* | 4/2017 | Ouyang ................. H01Q 21/28 |

OTHER PUBLICATIONS

International Search Report and Written Opinion dated Aug. 15, 2017 for International Application No. PCT/US2017/035536, 11 pages.

International Search Report and Written Opinion dated Jun. 30, 2017 for International Application No. PCT/US17/35538, 8 pages.

Advisory Action dated Mar. 9, 2018 in U.S. Appl. No. 15/444,243, filed Feb. 27, 2017, 2 pages.

Office Action dated May 22, 2018 in Taiwan Patent Application No. 106119008 filed on Jun. 8, 2017.

Office Action dated Jun. 29, 2018 for Taiwan Patent Application No. 106119009 of Essential Products, Inc.

\* cited by examiner

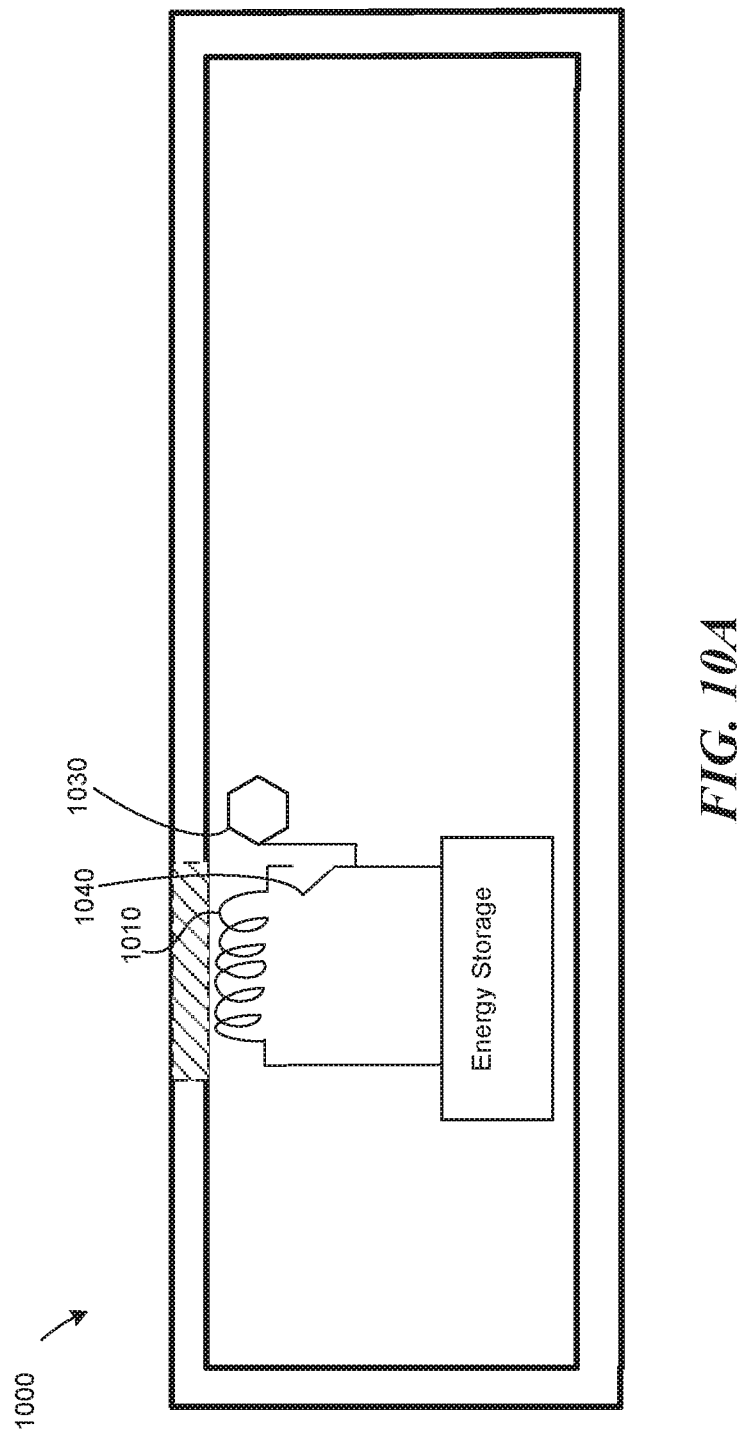

COMMUNICATION BETWEEN DEVICES AND DEVICE ACCESSORIES

CROSS-REFERENCE TO RELATED APPLICATIONS

This application claims priority to the U.S. provisional patent application Ser. No. 62/344,070 filed Jun. 1, 2016, U.S. provisional patent application Ser. No. 62/457,129 filed Feb. 9, 2017, and U.S. provisional patent application Ser. No. 62/457,563 filed Feb. 10, 2017, which are incorporated herein by reference in their entirety.

TECHNICAL FIELD

At least one embodiment of this disclosure relates generally to a device, and in particular to communication between devices and device accessories.

BACKGROUND

A general-purpose device, such as a smartphone or a smart speaker, has a general-purpose operating system (OS) that enables various third-party applications to utilize various hardware components (e.g., a display, a camera, a touchscreen, data storage, speaker, microphone, global positioning system (GPS) module, various sensors, various output components, etc.) of the device. The device can communicate with other computing devices via the wireless protocols, such as Bluetooth or Wi-Fi. However, these wireless protocols have limited bandwidth, and are unable to replace high bandwidth wired communication protocols, such as universal serial bus (USB).

SUMMARY

Various embodiments include a device that implements a high bandwidth wireless data interface (e.g., Si Beam connector interface) for communication between the device and a device accessory. For example, the high bandwidth wireless data interface can use an extremely high frequency (EHF) carrier to transport electrical-based protocols over a short distance through non-metallic material and air. To implement the high bandwidth wireless data interface, the device can include a wireless data transceiver configured in accordance with the high bandwidth wireless data protocol. Various embodiments include an attachment mechanism, and an energy transfer mechanism (e.g. an energy source) between the device and the device accessory.

The device can include an external shell and a display (e.g., a touchscreen). In some embodiments, the external shell and the display together hermetically seal various other components of the device. The wireless data transceiver can be sandwiched between the display and the external shell. In some embodiments, the device includes the attachment mechanism, an alignment mechanism (e.g., for magnetic alignment between a device and a device accessory), a wireless transmission mechanism (e.g., for minimizing interference or signal blockage from any metal in the external shell), and a wired or wireless energy source (e.g., for sharing power between the device and the device accessory).

Some embodiments of this disclosure have other aspects, elements, features, and steps in addition to or in place of what is described above. These potential additions and replacements are described throughout the rest of the specification.

BRIEF DESCRIPTION OF THE DRAWINGS

FIGS. 10A-10B show cross-section of the device accessory without a wireless data transceiver.

DETAILED DESCRIPTION

Device and Device Accessories

Various embodiments include a device that implements a high bandwidth wireless data interface (e.g., Si Beam connector interface) for communication between the device and a device accessory. For example, the high bandwidth wireless data interface can use an extremely high frequency (EHF) carrier to transport electrical-based protocols over a short distance through non-metallic material and air. To implement the high bandwidth wireless data interface, the device can include a wireless data transceiver configured in accordance with the high bandwidth wireless data protocol. Various embodiments include an attachment mechanism, and an energy source between the device and the device accessory.

The device can include an external shell and a display (e.g., a touchscreen). In some embodiments, the external shell and the display together hermetically seal various other components of the device. The wireless data transceiver can be sandwiched between the display and the external shell. In some embodiments, the device includes the attachment mechanism, an alignment mechanism (e.g., for magnetic alignment between a device and a device accessory), a wireless transmission mechanism (e.g., for minimizing interference or signal blockage from any metal in the external shell), and a wired or wireless energy source (e.g., for sharing power between the device and the device accessory).

Some embodiments of this disclosure have other aspects, elements, features, and steps in addition to or in place of what is described above. These potential additions and replacements are described throughout the rest of the specification.

Figure 1B:
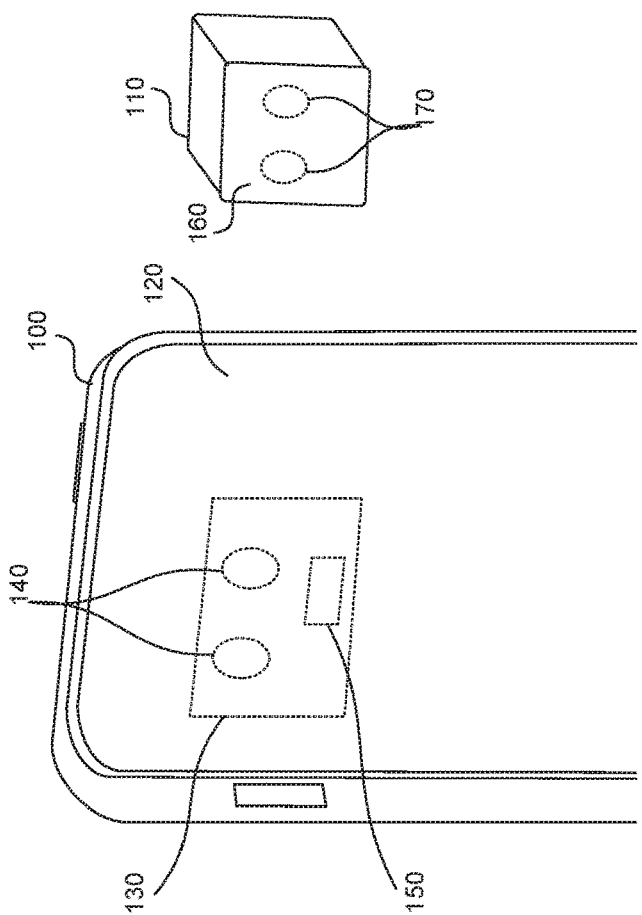
FIG. 1B is a back view of the device, and the device accessory separated from the device.
Figure 1A:
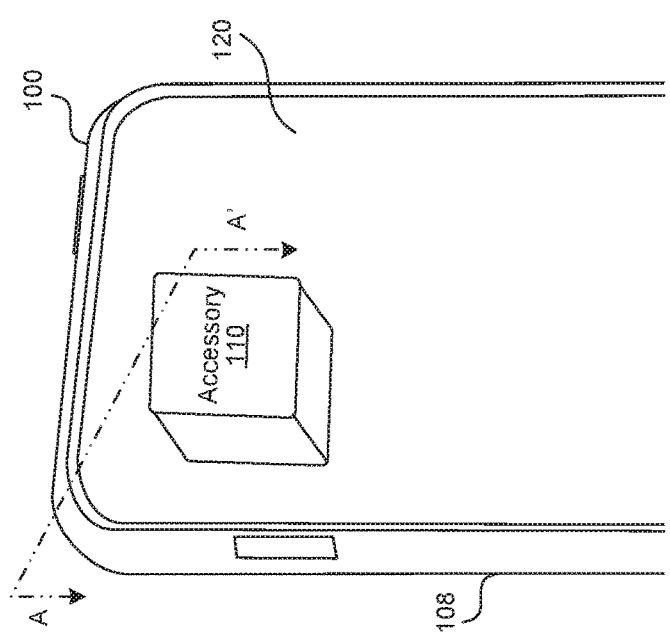
FIG. 1A is a back view of a device and a device accessory attached to the device 100.

FIG. 1A is a back view of a device 100 and a device accessory 110 attached to the device 100. The device 100 can be a mobile device such as a tablet, a smart phone etc., can be a smart speaker such as Amazon Echo, Google home, etc., a personal digital assistant, etc. The device accessory 110 is attached to the backside 120 of the device 100. The device accessory 110 can be an external memory, a camera, a speaker, a power source, a battery charger, a soundcard, etc. The backside 120 is part of the external shell 108 of the device 100. The external shell 108 along with the display screen of the device can hermetically seal various components (not all shown in the figures) of the device 100.

FIG. 1B is a back view of the device 100, and the device accessory 110 separated from the device 100. The front side (not pictured) of the device 100 contains a display screen. The backside 120 of the device 100 contains on attachment region 130, where the device accessory 110 can be attached to the device 100. The attachment region 130 can be designated with a visual guide indicating the location of the attachment region 130. The visual guide can be a perimeter of color different from the rest of the backside 120, can be a slight protrusion, or a slight indentation on the backside 120, etc. The attachment region 130 can optionally include power connectors 140, and a switch 150. The switch 150 can be a proximity sensor, an ambient light sensor, a button, a mechanical switch, etc.

The side 160 of the device accessory 110 which attaches to the device 100, can be blank, or can optionally contain power connectors 170, which when connected to the power connectors 140 on the device 100 allow a transfer of power between the device 100 and the device accessory 110.

Figure 2:
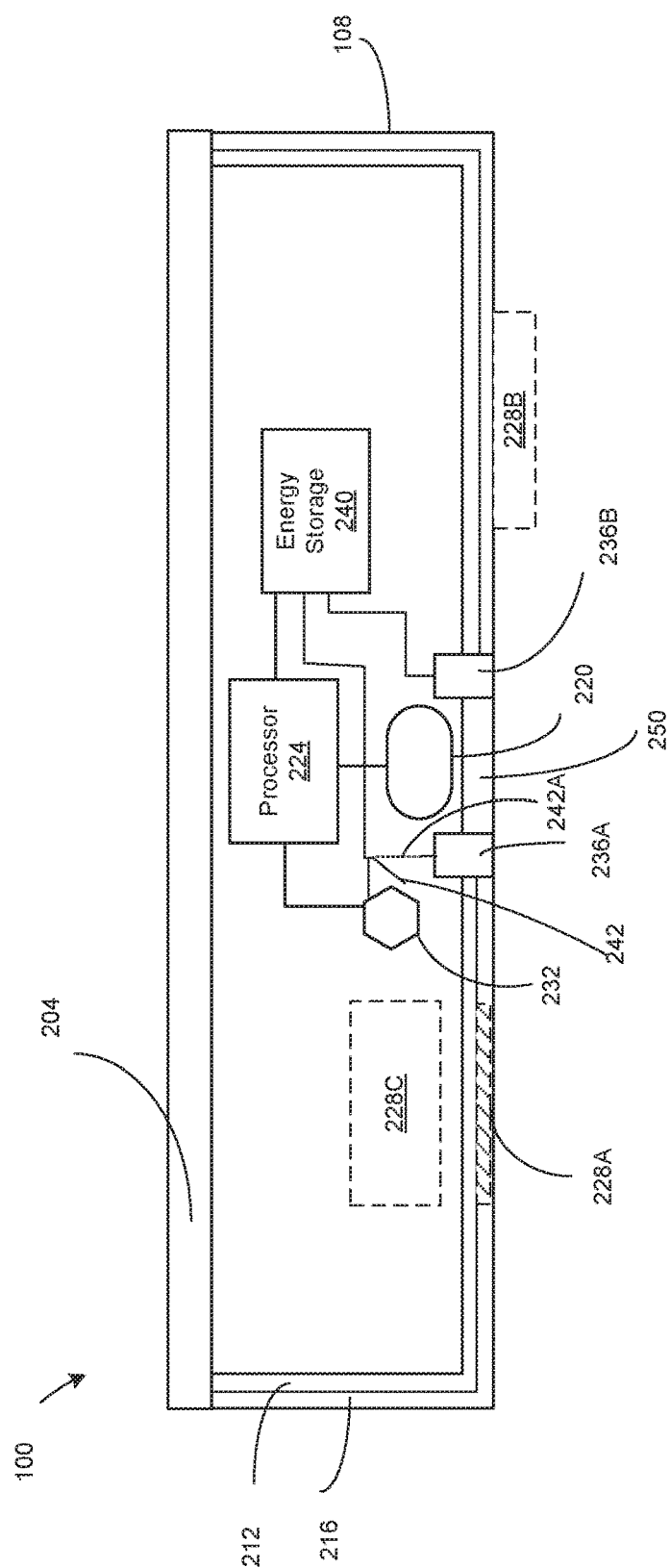
FIG. 2 is a cross-section of the device along the cross-sectional lines A-A' of FIG. 1A, according to one embodiment.

FIG. 2 is a cross-section of the device 100 along the cross-sectional lines A-A' of FIG. 1A, according to one embodiment. Various components of the device 100 are illustrated with different shapes for convenience of illustration. However, this disclosure contemplates various other shapes for the various components to perform the same functions as described.

In some embodiments, the display screen 204 and an external shell 108 can hermetically seal various components (not all shown in the figures) of the device 100. The various components 220, 224, 232, 236A, 236B, 240, can be part of a printed circuit board contained inside the device 100. In some embodiments, the external shell 108 includes a metallic shell 212 and a ceramic coating 216. For example, the metallic shell 212 can be a titanium shell and the ceramic coating 216 can be composed of titanium oxide.

The device 100 can include a wireless data transceiver 220. The wireless data transceiver 220 is enclosed by the external shell 108 and placed close to the non-metallic region of the external shell. The wireless data transceiver 220 can transmit data at extremely high electromagnetic frequencies between the device 100 and a device accessory, or at electromagnetic frequencies used by wireless USB in the 3.1 to 10.6 GHz range. Extremely high electromagnetic frequencies (EHF) are a band of radio frequencies in the electromagnetic spectrum from 30 to 300 GHz. The wireless data transceiver 220 transmits the data through the non-metallic region 250 of the external shell 108.

A processor 224 of the device 100 can communicate with a device accessory (e.g., a device accessory) via the wireless data transceiver 220. The processor 224 can implement an operating system and expose the use of the wireless data transceiver 220 to various applications running on the operating system. The wireless data transceiver 220 can be an extreme high-frequency (EHF) electrical-based communication protocol, such as Keyssa Kiss Connectivity protocol, or SiBeam Snap wireless connector technology. Further, wireless data transceiver 220 can use wireless USB frequencies. The wireless data transceiver 220 enables high bandwidth data communication with another wireless data transceiver (e.g., when there is no conductive material between the two wireless data transceivers to block the signal). The high bandwidth data communication between the device and the device accessory communication can use EHF.

The processor 224 can initiate a handshake between the device accessory and the wireless data transceiver 220. To initiate the handshake, the processor 224 can send a request for communication to the device accessory. Upon receiving a matching response from the device accessory, the processor 224 can wirelessly transfer data using the wireless data transceiver 220 to the device accessory.

In various embodiments, a portion of the metallic shell 212 can be shaved, carved, or etched off, or otherwise removed, during manufacturing to expose a cavity on an inner side of the external shell 108. The wireless data transceiver 220 can be installed within the cavity such that wireless radiofrequency (RF) transmission can enter and exit through the ceramic coating 216 without being interfered or blocked by the metallic shell 212.

In some embodiments, the device 100 includes an attachment mechanism 228 to hold a device accessory in proximity to the device 100. The attachment mechanism 228 can be a hook, or a recess within the external shell 108. The device accessory can include a complementary hook to attach to the device 100, or a complementary protrusion to insert into the recess of the device 10. The attachment mechanism 228 can be also be a magnet, or a magnetizable structure within the external shell 108.

For example, the magnetizable structure 228 can be a portion 228A of the ceramic coating 216 that is replaced by ferromagnetic material. In some embodiments, the magnetizable structure 228 can be manufactured by coating ferromagnetic material 228B over the ceramic coating 216. In another embodiment, the magnetizable structure 228 can be a plate 228C made out of ferromagnetic material, such as steel or iron, placed on or above the printed circuit board inside the device 100. Reference to the magnetizable structure 228 in the specification includes the magnetizable data structures 228A-C.

The magnetizable structure 228 facilitates the alignment of a wireless data transceiver of a device accessory with the wireless data transceiver 220 of the device 100. For example, adjacent to the wireless data transceiver of the device accessory can be a magnet. The magnet can couple with the magnetizable structure 228 to anchor the device 100 to the device accessory at the desired location.

In some embodiments, the device 100 includes a sensing switch 232 enclosed by the external shell 108. The sensing switch 232 enables the processor 224 to determine whether a device accessory is correctly aligned to communicate with the wireless data transceiver 220. Further, the sensing switch 232 detects when the device accessory is proximate to the device 100. Upon detecting the device accessory is close to the device 100, the sensing switch 232 can send a signal to the processor 224 to initiate the handshake with the device accessory, and/or can activate the energy source. For example, the sensing switch 232 can activate the energy source by closing the circuit switch 242. The sensing switch 232 can be an ambient light sensor, a proximity sensor, a pressure sensor, a touch sensor, a magnetic field sensor, etc.

The ambient light sensor upon detecting low ambient light intensity can activate the energy source, and/or send the signal to the processor 224 to initiate the handshake. The proximity sensor upon detecting an object proximate to the device 100 can activate the energy source, and/or send the signal to the processor 224 to initiate the handshake. The pressure sensor, upon detecting pressure, can activate the energy source, and/or send the signal to the processor 224 to initiate the handshake. The touch sensor, upon detecting contact between the device accessory and the device 100, can activate the energy source, and/or send the signal to the processor 224 to initiate the handshake.

The magnetic field sensor, such as a Hall effect sensor, upon detecting a steep rise in magnetic field, can activate the energy source, and/or send the signal to the processor 224 to initiate the handshake. Further, the magnetic field sensor can sense when the magnetizable structure 228, and the magnetic field sensor are aligned, and signal to the processor 224 that the wireless data transceiver 220 is ready for use. In various cases, a magnet of the device accessory, the magnetizable structure 228, and the magnetic field sensor can form a straight line.

In some embodiments, the device 100 has the magnet instead of the magnetizable structure 228. In some embodiments, the device 100 has the magnet, but not the magnetic field sensor 232. In these embodiments, the device accessory contains a magnetizable structure, and the magnetic field sensor. In these embodiments, the magnetic field sensor in the device accessory senses the proximity of the device 100, and initiates the handshake to communicate with the wireless data transceiver 220.

In various embodiments, the device 100 includes an energy source to transmit energy between the device 100 and the device accessory. The energy source can be wired or wireless. The energy source can include an energy storage 240, a circuit switch 242 and, when the energy source is wired, the energy source includes power connectors 236A, 236B. Further, the energy source can be activated by the sensing switch 232.

In FIG. 2, the energy source is wired, and includes a set of electrical conductors (e.g., a power conductor 236A and a power conductor 236B, collectively the "power connectors 236"). In these embodiments, the power connectors 236 enable the device 100 to provide or receive electrical power from the device accessory. In some embodiments, an insulator (not shown) surrounds the power connectors 236 to prevent electrical leakage through the metallic shell 212. In some embodiments, the power connectors 236 can surround the wireless data transceiver 220 on opposite sides. In other embodiments, the power connectors 236 can be positioned, while spaced apart, on the same side of the wireless data transceiver 220. For example, the device 100 can include an energy storage 240 (e.g., a battery or a capacitor). The device 100 can draw power from the energy storage 240 to provide over the power connectors 236. Also, the device 100 can draw power from the power connectors 236 when the device accessory is connected, and store the drawn power to the energy storage 240.

When the device accessory is not connected to the device 100, the circuit switch 242 is open, and the power connectors 236 do not provide voltage. When the sensing switch 232 detects proximity of the device accessory, the sensing switch 232 closes the circuit switch 242 (represented by dashed lines 242A), thus connecting the power connectors 236 to the energy storage 240, and providing voltage to the power connectors 236.

In some embodiments, the processor 224 can detect whether there is a resistor between the terminals of the device accessory respectively in contact with the power connectors 236. Based on the detection of resistance, the processor 224 can determine whether the device accessory is configured to receive power, to provide power, or to communicate with the device 100 without drawing or providing power. For example, the resistor can be a sense resistor in the device accessory, or in the device. Using the sense resistor and a comparator circuit, the processor 224 can determine whether the attached device accessory is a power source or a power sink.

Figure 3:
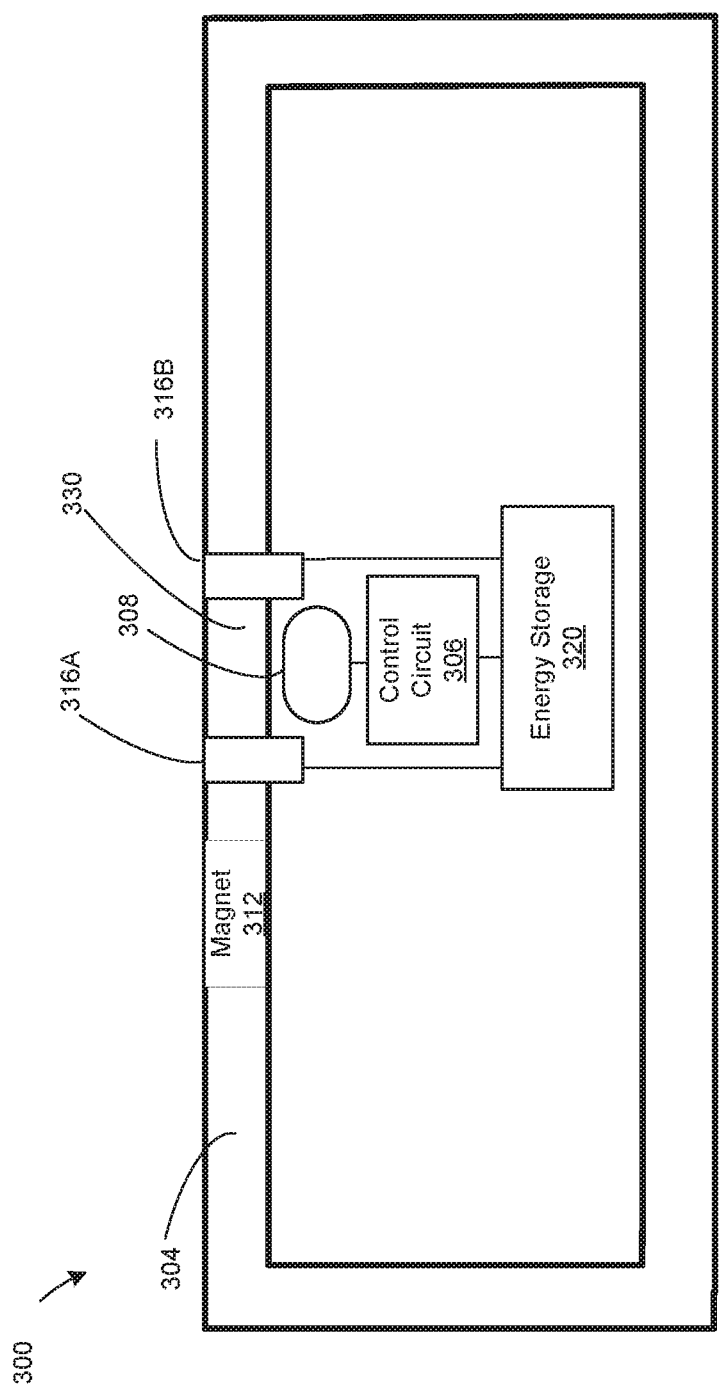
FIG. 3 is a cross-section of a device accessory along the cross-sectional lines A-A' of FIG. 1A, according to one embodiment.

FIG. 3 is a cross-section of a device accessory along the cross-sectional lines A-A' of FIG. 1A, according to one embodiment. The device accessory can be a device accessory 300. The device accessory 300 includes an external shell 304. The external shell 304 can comprise an electrical conductor, an electrical insulator, or a combination thereof. The external shell 304 can protect various components (e.g., a control circuit 306) therein. In some embodiments, the external shell 304 can hermetically seal the various components. The control circuit 306 can include a controller, a processor, an application-specific integrated circuit, or any combination thereof.

The device accessory 300 can include a wireless data transceiver 308. The wireless data transceiver 308 can be similar to the wireless data transceiver 220 in FIG. 2. For example, the control circuit 306 can utilize the wireless data transceiver 308 to communicate with the wireless data transceiver 220 in FIG. 2 (e.g., via an EHF wireless communication protocol, or wireless USB protocol). The wireless data transceiver 308 communicates through a non-metallic region 330 of the external shell 304.

A magnet 312 can be attached to the external shell 304. In some embodiments, the magnet 312 is exposed on an outer surface of the external shell 304, as shown in FIG. 3. In some embodiments, the magnet 312 is not exposed on an outer surface of the external shell 304, and a portion of the external shell 304 adjacent to the magnet 312 is comprised of non-ferromagnetic and non-magnetizable material that does not interfere with the magnetic field generated by the magnet 312. The portion of the external shell 304 can also be non-metallic, to avoid attenuating the magnetic field generated by the magnet 312. In some embodiments, the magnet 312 is a passive magnet. In some embodiments, the magnet 312 is an electrical magnet that consumes electrical power. The magnet 312 can be used to anchor the device accessory 300 to another device (e.g., the device 100 of FIGS. 1A-B, 2). This anchoring ensures that the wireless data transceiver 308 is aligned with a wireless data transceiver (e.g., the wireless data transceiver 220 in FIG. 2) of the device. In some embodiments, the device accessory 300 includes multiple magnets that correspond to multiple magnetizable structures on the other device. Use of multiple magnets can ensure that alignment is ensured along multiple dimensions.

The device accessory 300 can include multiple electrical conductors (e.g., a power conductor 316A and a power conductor 316B, collectively as the "power connectors 316"). The power connectors 316 enable the device accessory 300 to provide or receive electrical power from the other device (e.g., the device). In some embodiments, an insulator (not shown) surrounds the power connectors 316 to prevent electrical leakage through the external shell 304 (e.g., if the external shell 304 is electrically conductive around the power connectors 316). In some embodiments, the power connectors 316 can surround the wireless data transceiver 308 on opposite sides. In other embodiments, the power connectors 316 can be positioned, while spaced apart, on the same side of the wireless data transceiver 308. For example, the device accessory 300 can include an energy storage 320 (e.g., a battery or a capacitor). The device accessory 300 can draw power from the energy storage 320 to provide to the device over the power connectors 316. The device accessory 300 can also draw power from the power connectors 316 when the device is connected and store the drawn power to the energy storage 320.

In some embodiments, the control circuit 306 can detect whether there is a resistor between the terminals of the device accessory respectively in contact with the power connectors 316. Based on the detection of resistance, the control circuit 306 can determine whether the other device is configured to receive power, to provide power, or to communicate with the device accessory 300 without drawing or providing power.

In some embodiments, the magnet 312 and the power connectors 316 protrude from the external shell 304. In various embodiments, tips of the power connectors 316 and the magnet 312 can be on a flat plane parallel to a flat exterior surface of the external shell 304. In some embodiments, the power connectors 316 and the magnet 312 form a continuous flat surface with the external shell 304 without protrusion.

Figure 4:
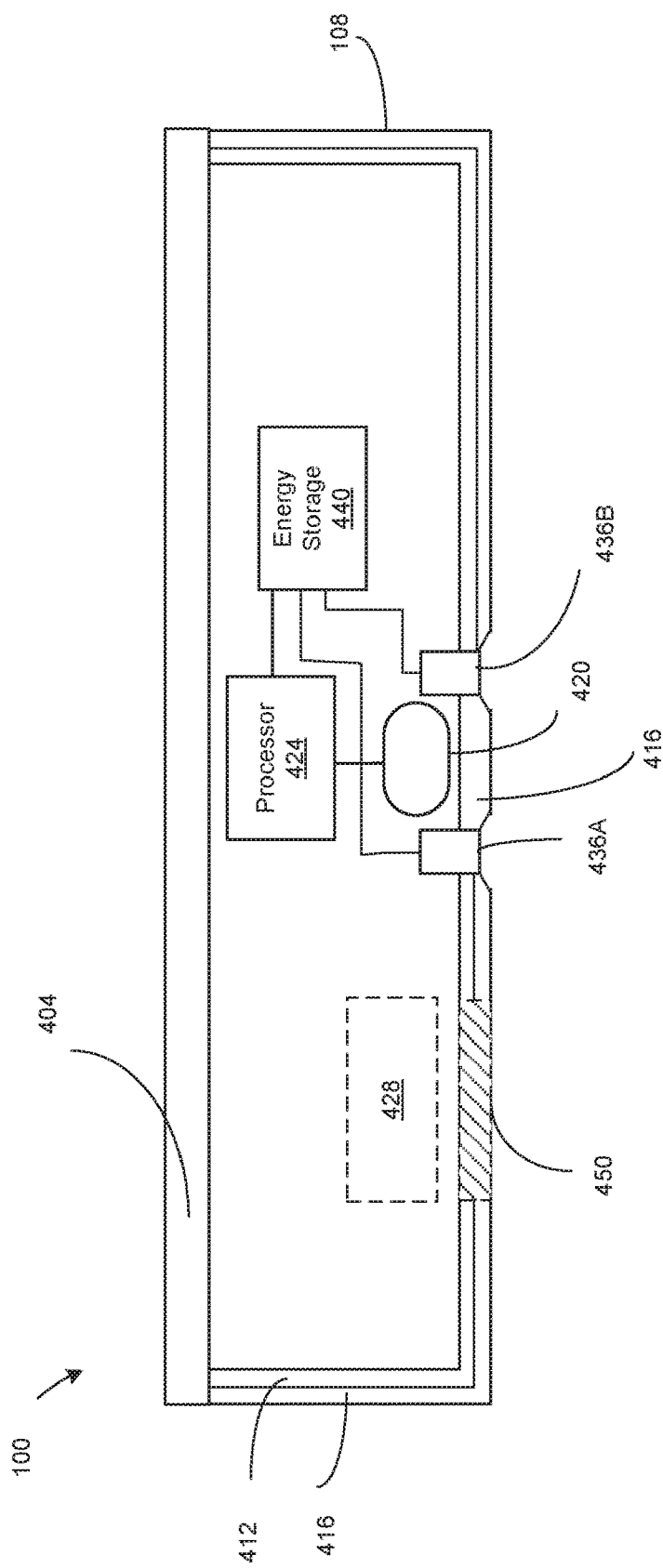
FIG. 4 is a cross-section of the device along the cross-sectional lines A-A' of FIG. 1A, according to another embodiment.

FIG. 4 is a cross-section of the device 100 along the cross-sectional lines A-A' of FIG. 1A, according to another embodiment. The device 400 includes an external shell 408, a wireless data transceiver 420, an energy source 436A, 436B, 440, and an attachment mechanism 428. In this embodiment, the device 400 does not include a sensing switch to activate the energy source and/or to initiate the handshake between the device 400 and a device accessory.

The energy source includes the power connectors 436A, 436B, and the energy storage 440. Without the sensing switch, the power connectors 436A, 436B are continually connected to the energy storage 440, and are continually producing voltage. To prevent establishing electrical contact with a surface that comes into contact with the external shell 408 of the device, the power connectors 436A, 436B are slightly recessed inside the external shell 408 as shown in FIG. 4. For example, if a user's finger touches the external shell 408 surrounding the power connectors 436A, 436B, the user's finger will not be stung by electricity because the power connectors 436A, 436B are recessed, thus preventing contact between the user's finger in the power connectors 436A, 436B.

The attachment mechanism 428 can be a hook, a recess, a magnet, a magnetizable structure, etc., same as the attachment mechanism 228 in FIG. 2. When the attachment mechanism 428 is a magnet, in some embodiments, the magnet 428 can be exposed on an outer surface of the external shell 408. In some embodiments, the magnet 428 is not exposed on an outer surface of the external shell 408, as shown in FIG. 4, and a portion 450 of the external shell 408 adjacent to the magnet 428 is comprised of non-ferromagnetic and non-magnetizable material that does not interfere with the magnetic field generated by the magnet 428. The portion 450 of the external shell 408 can also be non-metallic to avoid attenuating the magnetic field generated by the magnet 428. In some embodiments, the magnet 428 is a passive magnet. In some embodiments, the magnet 428 is an electrical magnet that consumes electrical power. When the magnet 428 is an electrical magnet, the magnet 428 can be connected to the energy storage 440.

Figure 5:
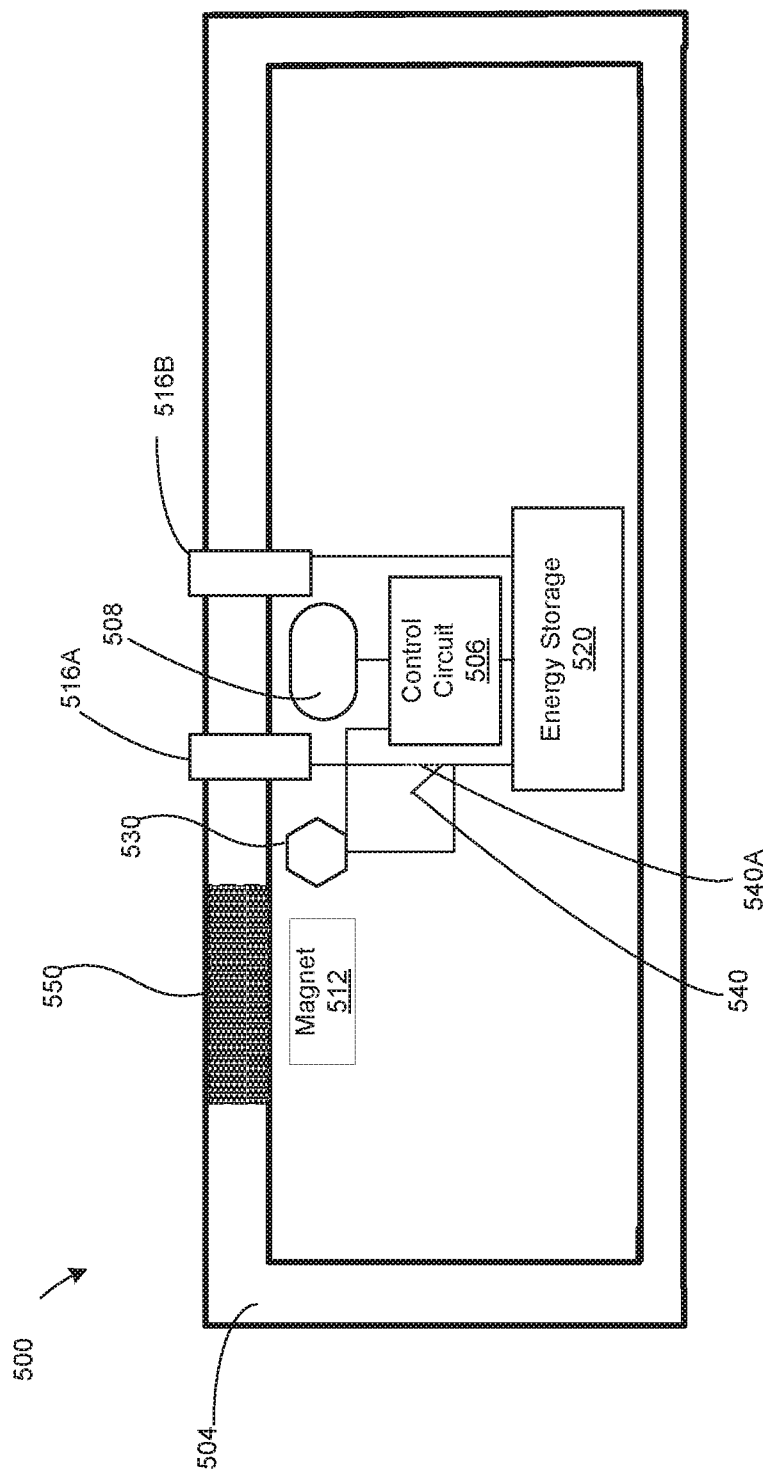
FIG. 5 is a cross-section of a device accessory along the cross-sectional lines A-A' of FIG. 1A, according to another embodiment.

FIG. 5 is a cross-section of a device accessory along the cross-sectional lines A-A' of FIG. 1A, according to another embodiment. The device accessory 500 of FIG. 5 is similar to the device accessory 300 of FIG. 3, in that device accessory 500 contains an external shell 504, a wireless data transceiver 508, the control circuit 506, an energy source including elements 520, 516A, 516B, and an attachment mechanism 512.

The difference between device accessory 500 and the device accessory 300, is that power connectors 516A, 516B protrude from the exterior of the external shell 504. When connected to the device 100 in FIG. 4, the protruding power connectors 516A, 516B, establish electrical contact with the recessed power connectors 436A, 436B in FIG. 4.

Because the power connectors 516A, 516B protrude from the shell, and can easily come into contact with a person's skin, the power connectors 516A, 516B do not produce voltage when the device accessory 500 is not attached to a device. To prevent the power connectors 516A, 516B from producing voltage, the circuit between the energy storage 520 and the power connectors 516A, 516B contains a circuit switch 540, which is open when the device accessory 500 is not attached to a device 100. When the circuit switch 540 is open, the power connectors 516A, 516B do not produce voltage. When the circuit switch is closed 540A, the power connectors 568, 516B are connected to the energy storage 520, and thus produce voltage.

The attachment mechanism 512 corresponds to the attachment mechanism 428 of device 100. The attachment mechanism 512 can be a hook, a protrusion, a magnet, or a magnetizable structure. When the attachment mechanism 512 is a magnet, or a magnetizable structure, the attachment mechanism 512 is proximate to a non-ferromagnetic and non-magnetizable region 550 of the exterior shell 504. The region 550 can also be non-metallic, to avoid attenuating the magnetic field between the device accessory and the device. The region 550 is the region of the external shell 504 closest to the attachment mechanism 512.

The device accessory 500 includes a sensing switch 530. The sensing switch 530 can be an ambient light sensor, a proximity sensor, a pressure sensor, a touch sensor, a magnetic field sensor (such as a Hall effect sensor), etc. The sensing switch 530 detects when the device accessory 500 is proximate to the device 100. Upon detecting the device accessory is close to the device 100, the sensing switch 530 can send a signal to the control circuit 506 to initiate the handshake with the device 100, and/or can activate the energy source. For example, the sensing switch 530 can activate the energy source by causing the circuit switch to close 540A.

Figure 6:
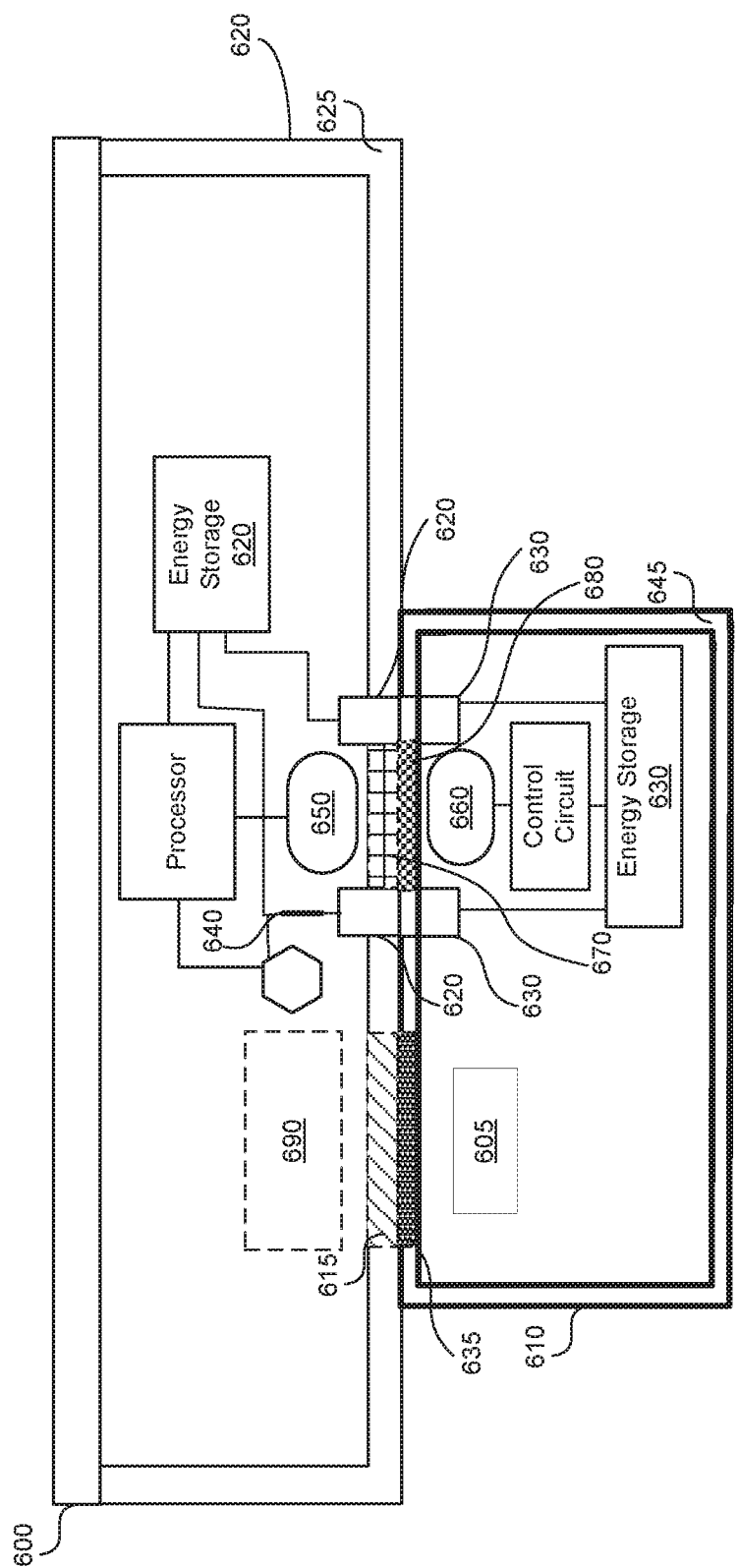
FIG. 6 is a first example of a cross-sectional side view of a device 600 coupled to a device accessory 610.

FIG. 6 is a first example of a cross-sectional side view of a device 600 coupled to a device accessory 610. Because the device 600 and the device accessory 610 are attached to each other, the energy sources 620, 630 in both the device 600 and the device accessory 610 are activated, and the circuit switch 640 is closed, allowing electrical current to flow between the energy source 620, 630. Further, the wireless data transceivers 650, 660 in both the device 600 and the device accessory 610 can wirelessly transmit data to each other, through the non-metallic regions 670 of the external shell 625 of the device 600, and the non-metallic region 680 of the external shell 645 of the device accessory 610.

The attachment mechanism 690 in the device 600 can either be a magnetizable structure, or a magnet, while the corresponding attachment mechanism 605 in the device accessory 610 can be either a magnet, or a magnetizable structure, respectively. The attachment mechanism 690 is placed close to region 615 of the external shell 625. Region 615 is composed of non-ferromagnetic and non-magnetizable material. Similarly, the attachment mechanism 605 is placed close to the region 635 of the external shell 645. Region 635 is composed of non-ferromagnetic and non-magnetizable material. The attachment mechanism 690 and 605 attract each other through the non-ferromagnetic and non-magnetizable regions 615, 635. The non-ferromagnetic and non-magnetizable regions 615, 635 can also be non-metallic to avoid attenuating the magnetic field.

Figure 7:
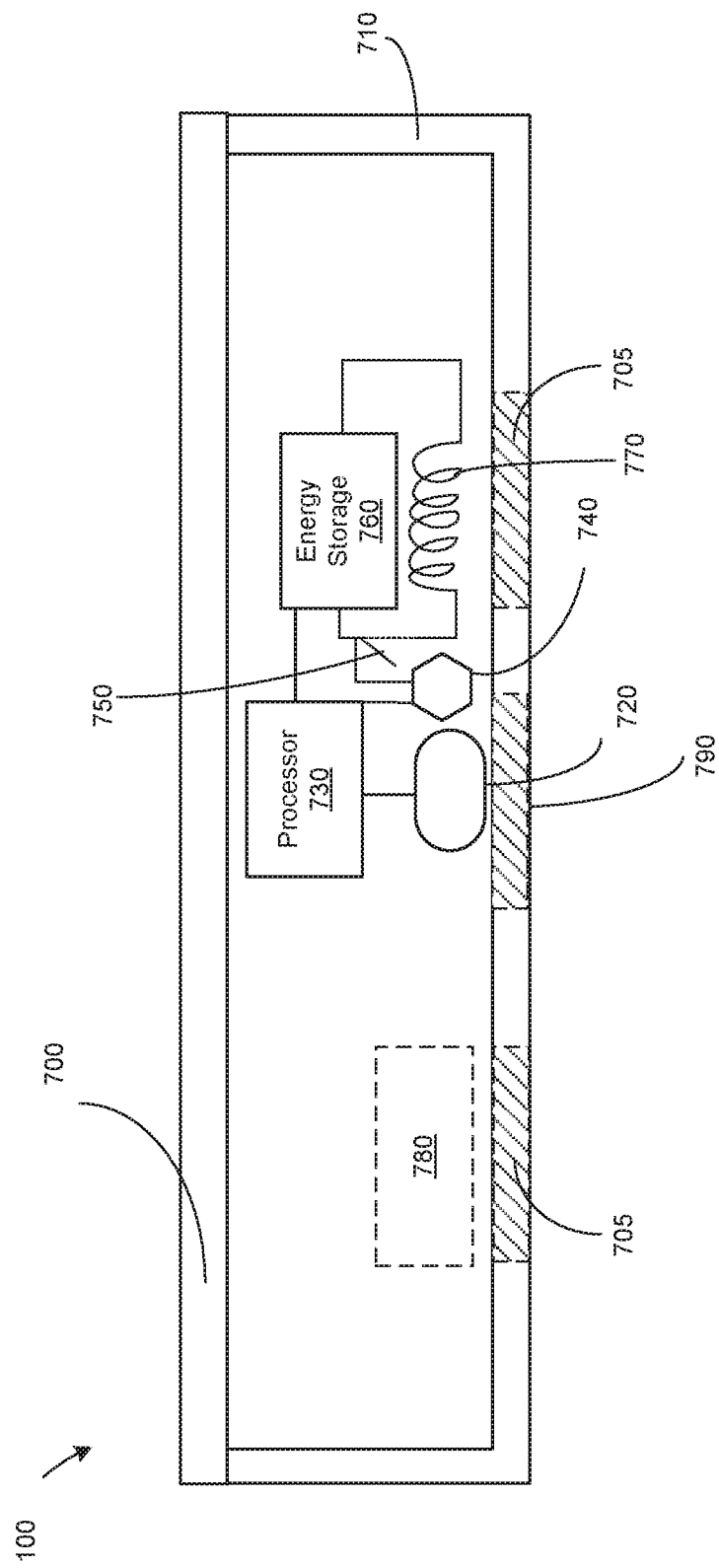
FIG. 7 is a cross-section of the device 100 along the cross-sectional lines A-A' of FIG. 1A, according to another embodiment.

FIG. 7 is a cross-section of the device 100 along the cross-sectional lines A-A' of FIG. 1A, according to another embodiment. The exterior of the device 100 is defined by the display screen 700 and an external shell 710. The display screen 700 and the external shell 710 enclose internal components including a wireless data transceiver 720, a processor 730, a sensing switch 740, the circuit switch 750, an energy storage 760, a solenoid 770, an optional attachment mechanism 780, etc.

The wireless data transceiver 720 transmits data at EHF, or wireless USB frequencies, between the device 100 and a device accessory. The wireless data transceiver 720 transmits the data through the non-metallic region 790 of the external shell 710.

The sensing switch 740 can be an ambient light sensor, a proximity sensor, a pressure sensor, a touch sensor, a magnetic field sensor (such as a Hall effect sensor), etc. The sensing switch 740 detects when the device accessory is proximate to the device 100. Upon detecting the device accessory is close to the device 100, the sensing switch 740 can send a signal to the processor 730 to initiate the handshake with the device 100, and/or can activate the energy source. For example, the sensing switch 740 can activate the energy source by closing the circuit switch 750.

The energy source includes the energy storage 760, and the solenoid 770. The energy source can be used in wireless energy transfer to the device accessory. The energy storage 760 can produce a change in the current in the solenoid 770. For example, the energy storage 760 can produce an alternating current (AC) in the solenoid 770 by passing a direct current (DC) through an DC-AC inverter, before the current reaches the solenoid 770. In another example, the energy storage 760 can produce a change in the current in the solenoid 770 by opening and closing the circuit switch 750. The change in the current in the solenoid 770 can, through electromagnetic induction, cause a current in a solenoid of the device accessory, thus transferring power between the solenoid 770 and the device accessory.

The attachment mechanism can be the solenoid 770 and/or an attachment mechanism 780, such as a magnet, or an object made out of a ferromagnetic material. When the solenoid 770 carries electric current, the solenoid 770 generates a magnetic field around the device 100. Similarly, when the solenoid of the device accessory carries electric current, the solenoid of the device accessory generates a magnetic field around the device accessory. As a result, the two solenoids attract each other through magnetic forces. To increase the strength of the magnetic field generated by two solenoids, the solenoid wire can include ferromagnetic core, such as iron. The region 705 of the external shell 710 closest to the solenoid 770 and/or the attachment mechanism 780 can be composed out of non-ferromagnetic material, to allow the magnetic field to emanate outside of the device 100, and attach to the device accessory. The region 705 of the external shell 710 can be also non-metallic to avoid attenuating the magnetic field emanating outside of the device 100.

Figure 8:
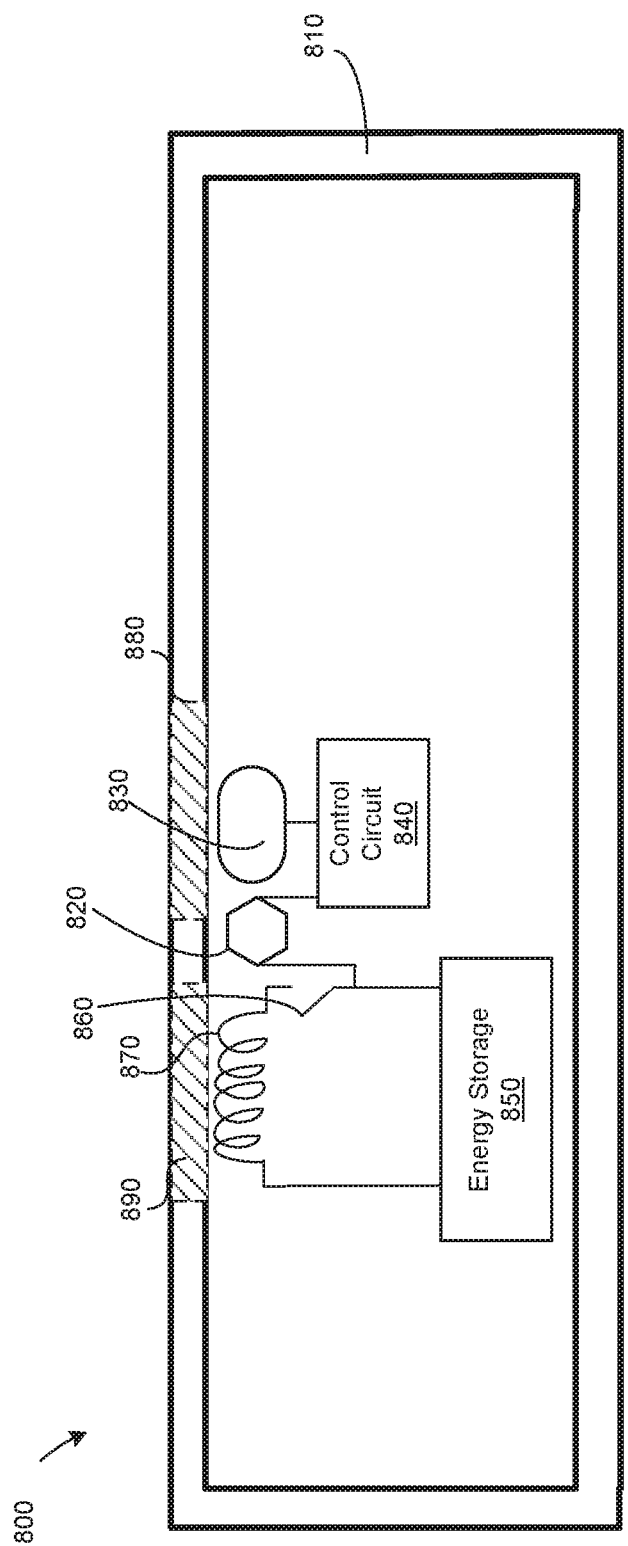
FIG. 8 is a cross-section of a device accessory along the cross-sectional lines A-A' of FIG. 1A, according to another embodiment.

FIG. 8 is a cross-section of a device accessory along the cross-sectional lines A-A' of FIG. 1A, according to another embodiment. The external shell 810 of device accessory 800 includes a sensing switch 820, a wireless data transceiver 830, a control circuit 840, an energy storage 850, a circuit switch 860, in a solenoid 870.

As described herein, after the sensing switch 820 detects proximity of the device, the sensing switch 820 closes the circuit switch 860, thus enabling power transfer between the device accessory 800, and the device. Further, the sensing switch 820 can activate the control circuit 840 to start the handshake with the device, and/or initiate wireless data transfer through the wireless data transceiver 830. The wireless data transceiver 830 transmits data through a non-metallic region 880 of the external shell 810. The non-metallic region 880 is a region of the external shell 810 closest to the wireless data transceiver 830.

The solenoid 870 enables wireless power transfer between the device accessory and the device. In addition to, or instead of the solenoid 870, wireless power transfer can be achieved using other wireless power transfer mechanisms such as resonant inductive coupling, capacitive coupling, magnetodynamic coupling, etc. The various methods of wireless power transfer operate at frequencies below the 3.1 GHz range, so as to not interfere with the electromagnetic frequencies in the 3.1 to 10.6 GHz, and 30 to 30 GHz range used by the wireless data transceiver.

The solenoid 870 can carry a current induced by an external solenoid of the device, or the solenoid 870 can induce a current flow in the device. To induce the current flow in the device, the energy storage 850 can produce a change in the current in the solenoid 870. For example, the energy storage 850 can produce an alternating current (AC) in the solenoid 870 by passing a direct current (DC) through an DC-AC inverter, before the current reaches the solenoid 870. In another example, the energy storage 850 can produce a change in the current in the solenoid 870 by opening and closing the circuit switch 860. The change in the current in the solenoid 870 can, through electromagnetic induction, cause a current in a solenoid of the device accessory, thus transferring power between the solenoid 870 and the device accessory.

The attachment mechanism can be the solenoid 870 and/or an attachment mechanism, such as a magnet, or an object made out of a ferromagnetic material. When the solenoid 870 carries electric current, the solenoid 870 generates a magnetic field around the device accessory. Similarly, when the solenoid of the device carries electric current, the solenoid of the device generates a magnetic field around the device. As a result, the two solenoids attract each other through magnetic forces. To increase the strength of the magnetic field generated by two solenoids, the solenoid wire can include ferromagnetic core, such as iron. The region 890 of the external shell 810 closest to the solenoid 870 can be composed out of non-ferromagnetic and non-magnetizable material, to allow the magnetic field to emanate outside of the device accessory 800, and attach to the device. The region 890 of the external shell 810 can be also non-metallic to avoid attenuating the magnetic field emanating outside of the device accessory 800.

Figure 9A:
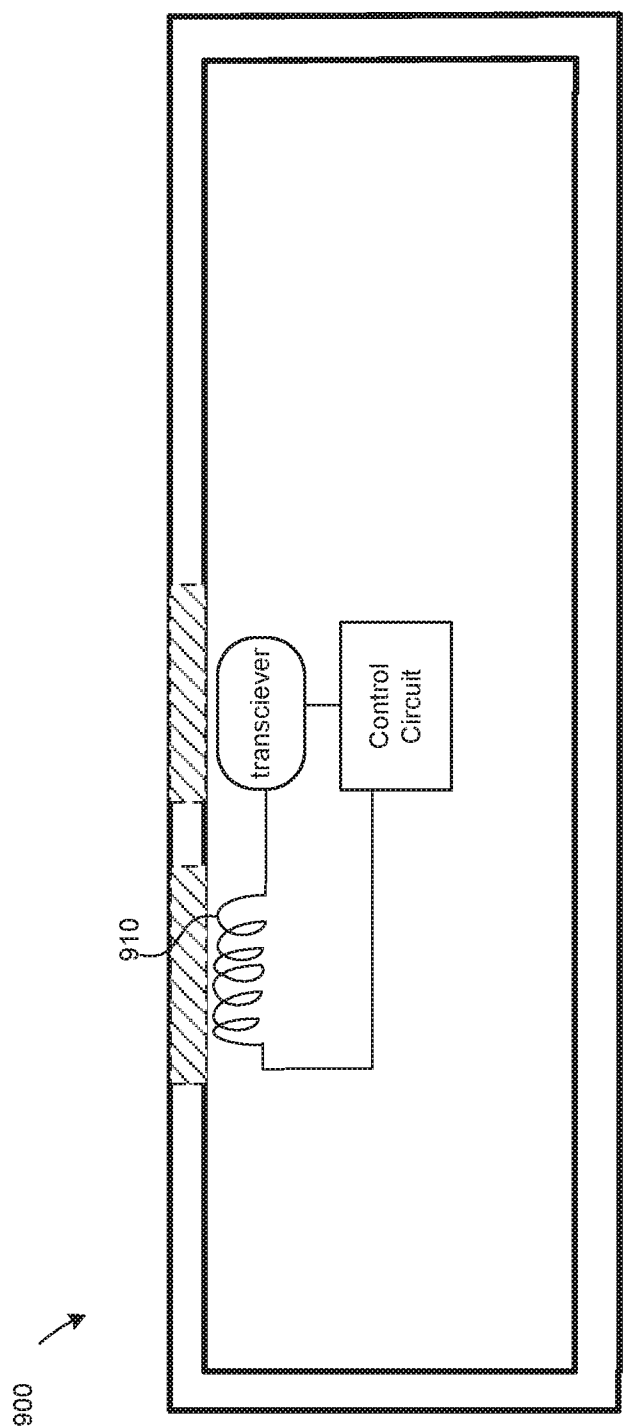
FIGS. 9A-9B show a cross-section of the device accessory without an energy storage.
Figure 9B:
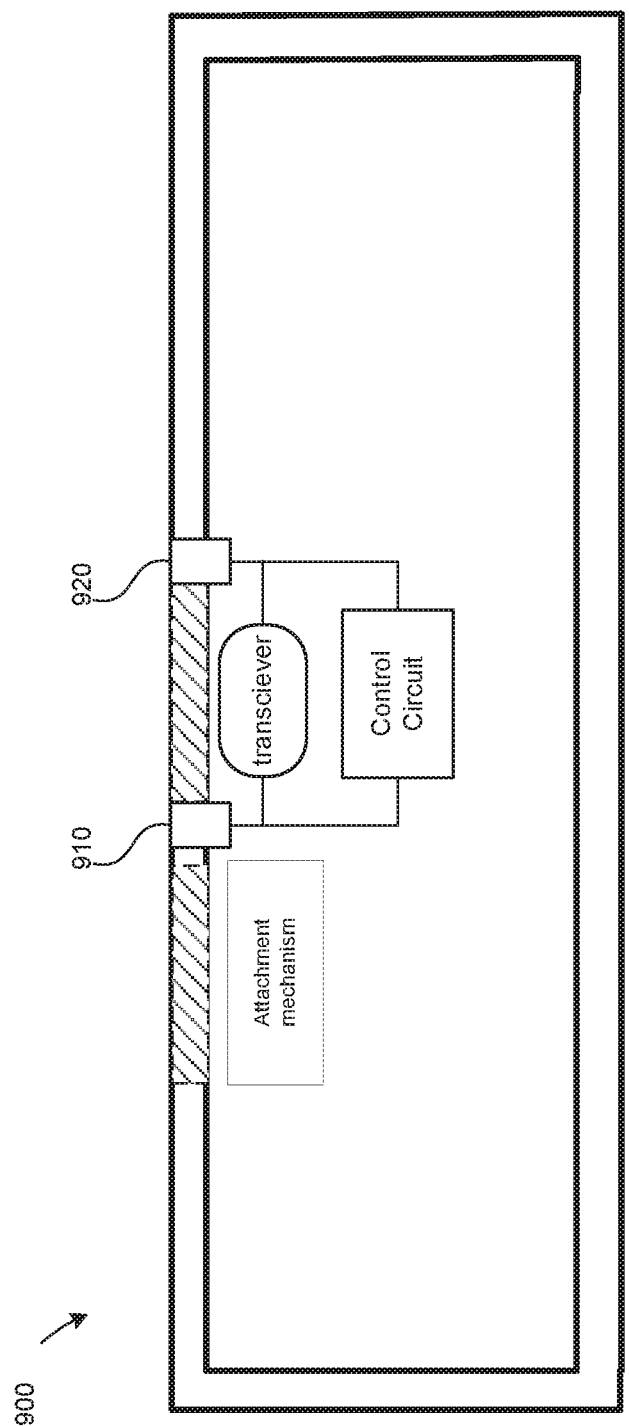

FIGS. 9A-9B show a cross-section of the device accessory without an energy storage. The device accessory 900 does not contain an energy storage, a sensing switch, and a circuit switch, because the device accessory is powered by the device, when the device accessory is attached to the device. In FIG. 9A the external computing 900 device is powered via wireless power transfer, such as a solenoid 910, resonant inductive coupling, capacitive coupling, magnetodynamic coupling, etc. The various methods of wireless power transfer operate at frequencies below the 3.1 GHz range, so as to not interfere with the electromagnetic frequencies in the 3.1 to 10.6 GHz, and 30 to 30 GHz range used by the wireless data transceiver. In FIG. 9B the device accessory 900 is powered via power connectors 920, 930.

Figure 10B:
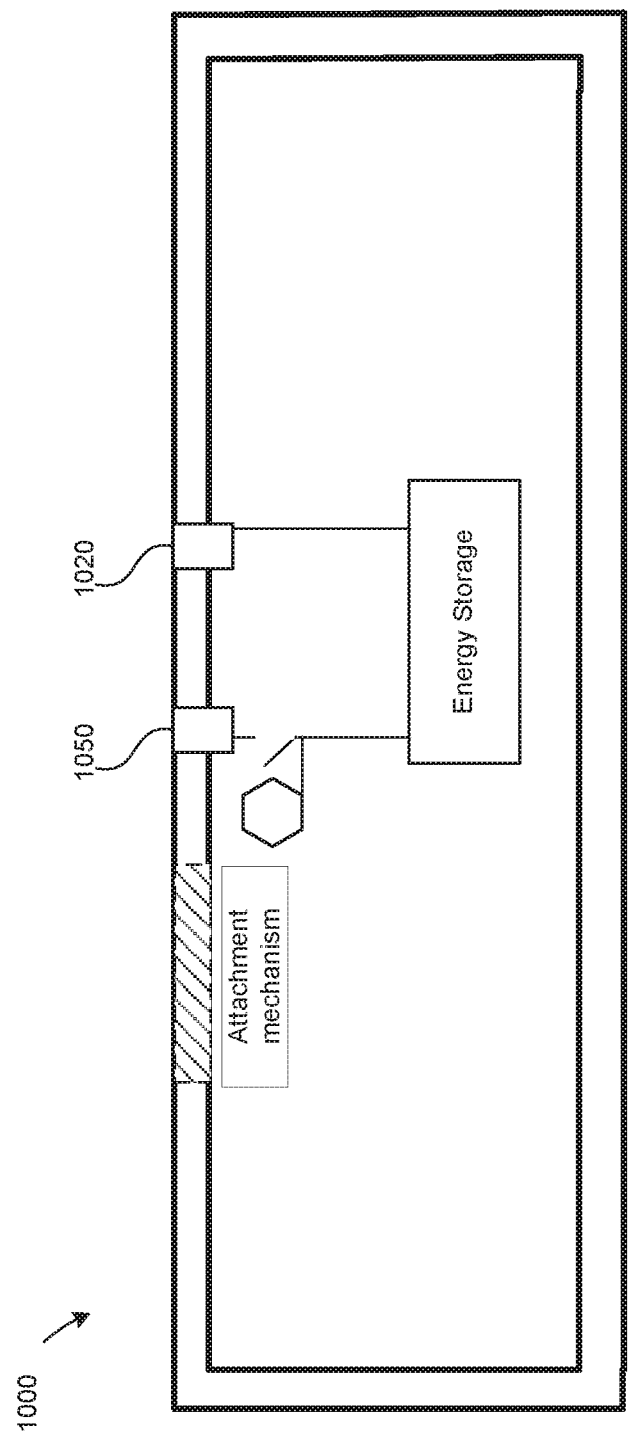

FIGS. 10A-10B show cross-section of the device accessory without a wireless data transceiver. The device accessory 1000 is an external charger containing a sensing switch 1030, which activates the power transfer mechanism (e.g. by closing the circuit switch 1040), when the device accessory 1000 is close to a device. In FIG. 10A the device accessory 1000 provides power to the device using wireless data transfer, such as a solenoid 1010. In FIG. 10B the device accessory 1000 provides power to the device using power connectors 1020, 1050.

Figure 11:
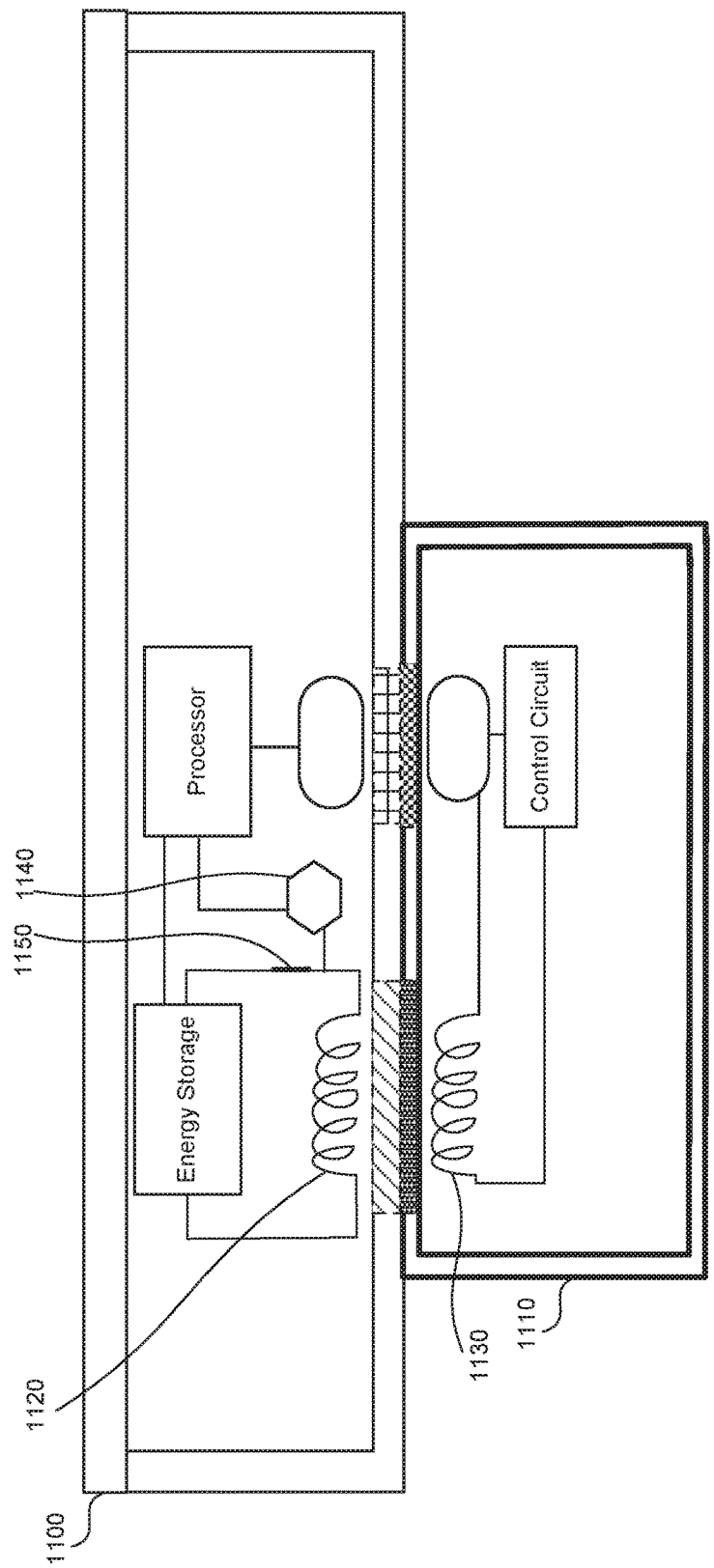
FIG. 11 is a second example of a cross-sectional side view of a device coupled to a device accessory.

FIG. 11 is a second example of a cross-sectional side view of a device 1100 coupled to a device accessory 1110. The device 1100, the device accessory 1110, are similar to the device 600 in FIG. 6, the device accessory 610 in FIG. 6.

One difference between FIG. 11 and FIG. 6, is that the device accessory 1110 does not have an internal energy storage, as does device accessory 610. Instead, the device accessory 1110 receives power from the device 1100, when the device accessory 1110 is attached to the device 1100. When the device accessory 1110 is attached to, or in proximity of, the device 1100, a sensor switch 1140 can close the circuit switch 1150 to initiate the power transfer between the device 1100 and the device accessory 1110.

Another difference between FIG. 11 and FIG. 6, is that the power transfer between the device 1100 and the device accessory 1110 is wireless. For example, the power transfer can be done using the solenoid 1120 in the device 1100, and solenoid 1130 in the device accessory 1110. The solenoids 1120, 1130 can act as the attachment mechanism between the device 1100, and the device accessory 1110. In another embodiment, the attachment can be performed using a magnet and a magnetizable structure, as described herein.

Audio Accessory

Figure 12:
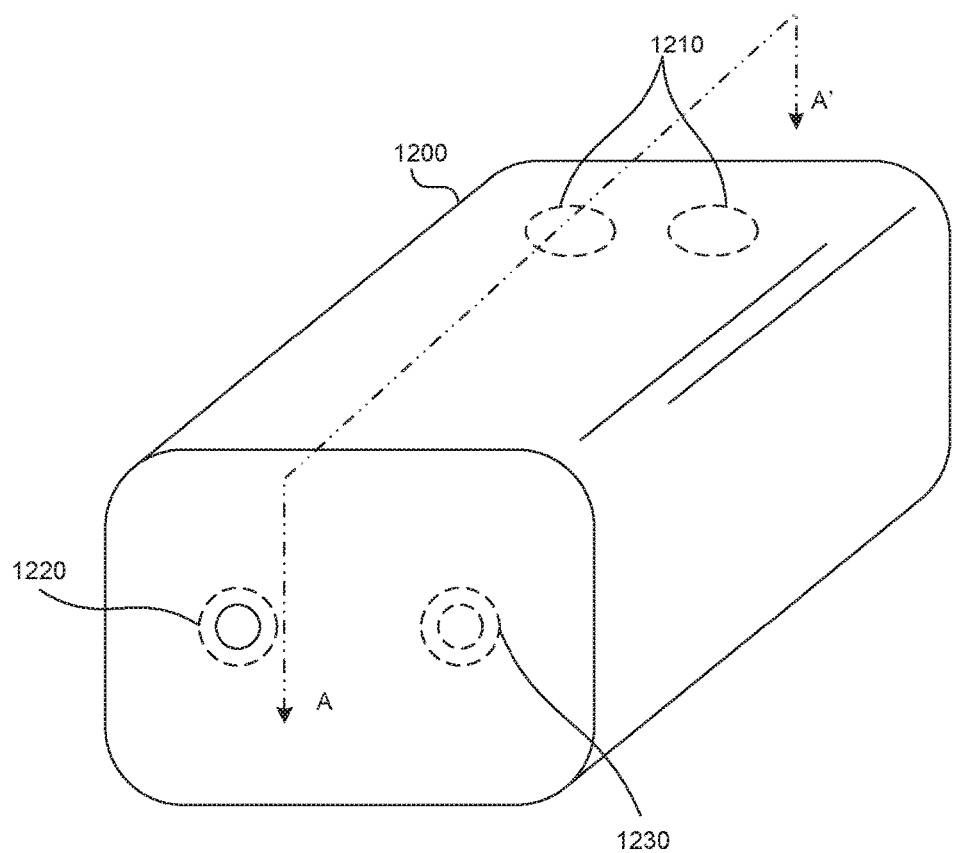
FIG. 12 is a wireless audio accessory, according to one embodiment.

FIG. 12 is a wireless audio accessory, according to one embodiment. In various embodiments, the wireless audio accessory 1200 can contain the features of the device accessory 110 in FIG. 1, 300 in FIG. 3, 500 in FIG. 5, 610 in FIG. 6, 800 in FIG. 8, in FIGS. 9A-9B, 1000 in FIGS. 10A-10B, 1100 and FIG. 11. The wireless audio accessory 1200 can be a device accessory.

The wireless audio accessory 1200 can contain optional power connectors 1210, and an optional one or more audio jacks 1220, 1230. Connecting the power connectors 1210 to the power connectors on a device 100, initiates a power transfer between the device and the wireless audio accessory 1200. Instead of the power connectors 1210, the power transfer between the device and the wireless audio accessory 1200 can be wireless. The audio jacks 1220, 1230 can be a 3.5 mm analog audio jack, 3.5 mm TRS-TOSLINK jack, 3.5 mm TRRS, RCA connector, etc.

Figure 13:
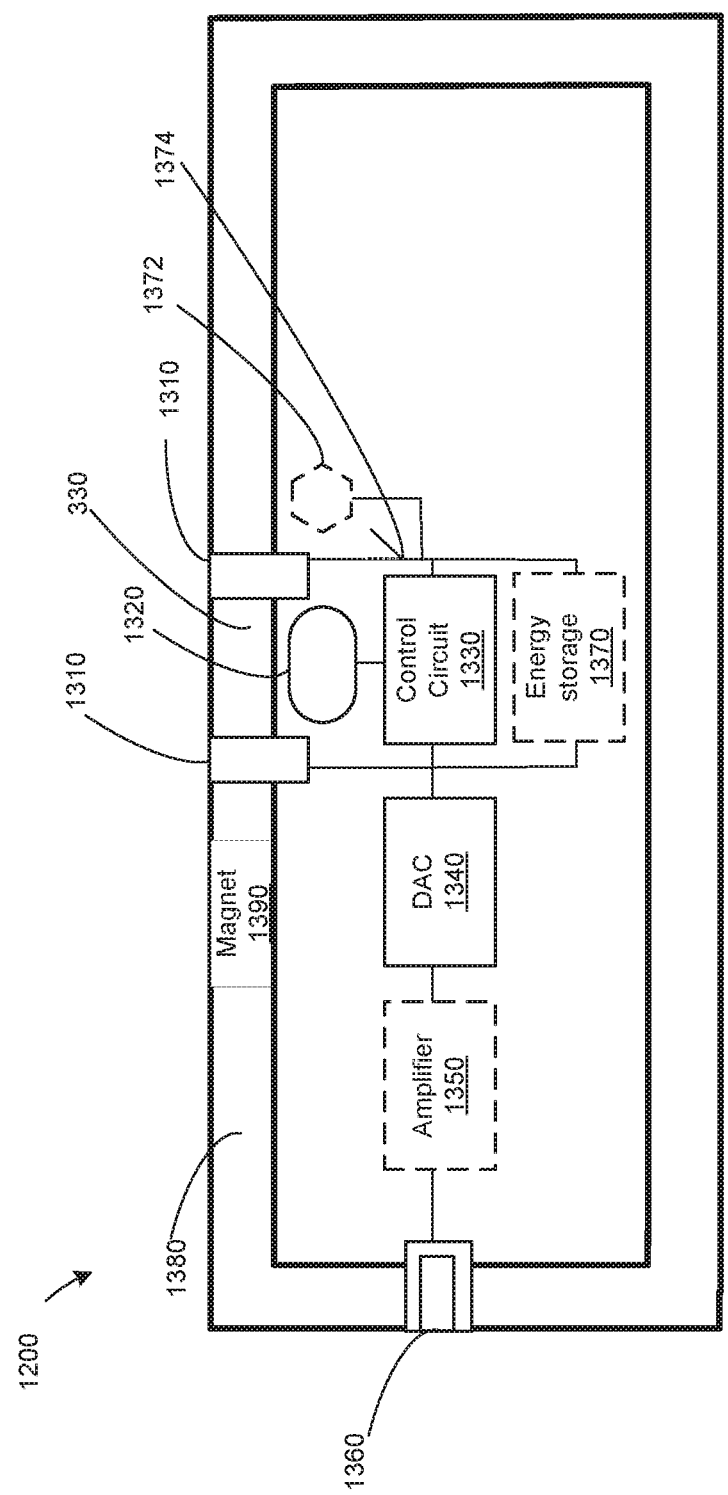
FIG. 13 is a cross-section of the wireless audio accessory 1200 along the cross-sectional lines A-A' of FIG. 12, according to one embodiment.

FIG. 13 is a cross-section of the wireless audio accessory 1200 along the cross-sectional lines A-A' of FIG. 12, according to one embodiment. The wireless audio accessory 1200 includes power connectors 1310, a wireless data transceiver 1320, the control circuit 1330, a digital to analog converter (DAC) 1340, an optional amplifier 1350, an audio jack 1360, an external shell 1380, a magnet 1390, an optional energy storage 1370, an optional sensing switch 1372, and an optional circuit switch 1374.

The external shell 1380 defines an outer surface of the wireless audio accessory 1200. The external shell 1380 contains a non-metallic region 1305 through which the wireless data transceiver 1320 can transmit data. The magnet 1390 is located within the external shell 1380. For example, the magnet 1390 can be integrated into the external shell 1380, as shown in FIG. 13, or the magnet 1390 can be enclosed inside the external shell 1380, as shown in FIGS. 5, 6, 9B, 10B. When the magnet is enclosed inside the external shell 1380, the external shell 1380 contains a non-ferromagnetic and non-magnetizable region, as shown in FIGS. 5, 6, 9B, 10B, allowing unimpeded passage of the magnetic field through the external shell.

As described in this application, the power connectors 1310 receive energy from an energy source within a device, when the power connectors 1310 are in contact with corresponding power connectors of the device. The power connectors 1310 transmit the received energy to the rest of the electronic elements inside the wireless audio device.

As described in this application, the control circuit 1330 can receive a handshake or initiate a handshake, such as a request for transmission of audio data. The wireless data transceiver 1320 can receive audio data from the device, or transmit audio data to the device, through the non-metallic region 1305.

The digital to analog converter 1340 converts the received digital audio data from the wireless data transceiver 1320 to an audio signal. In one embodiment, the DAC 1340 can send the output analog audio signal to an amplifier 1350, which then sends the amplified analog audio signal to an analog audio jack 1360. In another embodiment, the DAC 1340 can send the audio signal directly to the analog audio jack 1360.

When the wireless audio accessory 1200 includes the energy storage 1370, also included are the sensing switch 1372, and the circuit switch 1374. The sensing switch 1372 senses the proximity of the device and, in response, closes the circuit switch 1374, thus enabling the energy storage 1370 to charge when the wireless audio accessory 1200 is attached to the device. The sensing switch 1372 can be a Hall effect sensor, an ambient light sensor, a proximity sensor, a touch sensor, a pressure sensor, a button, etc.

Figure 14:
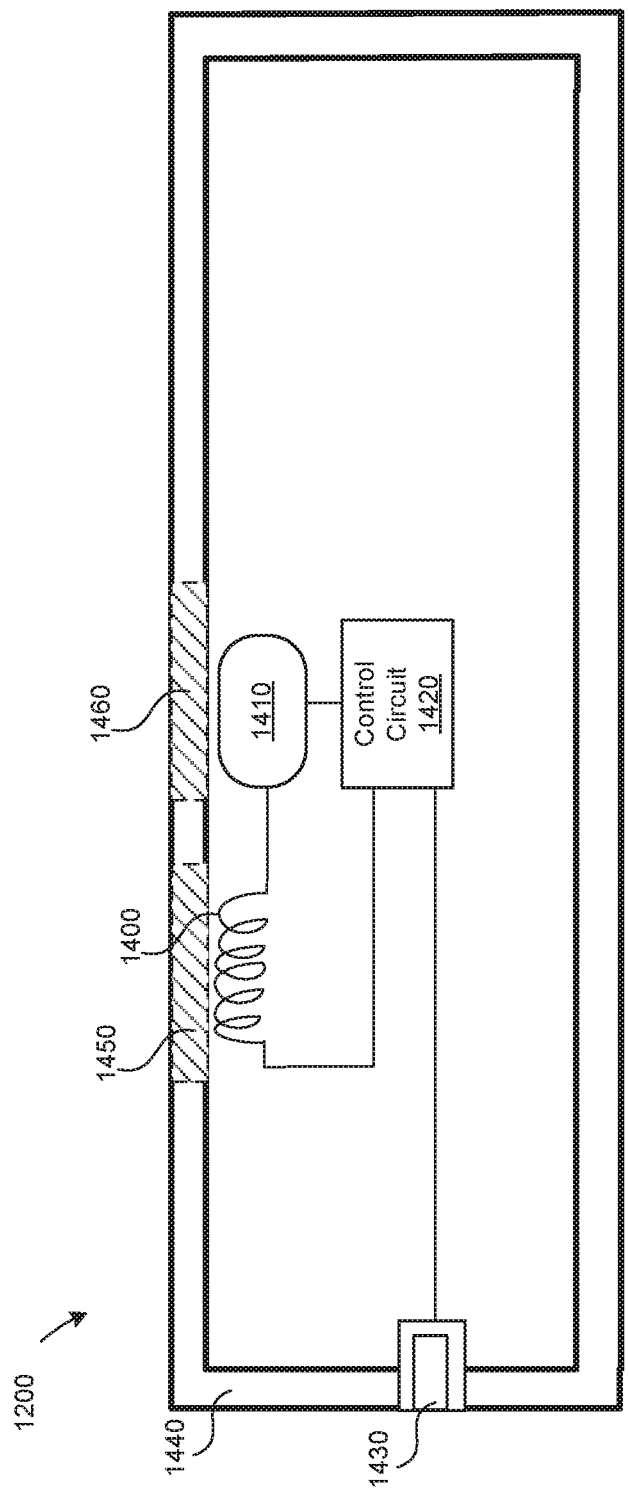
FIG. 14 is a cross-section of the wireless audio accessory 1200 along the cross-sectional lines A-A' of FIG. 12, according to another embodiment.

FIG. 14 is a cross-section of the wireless audio accessory 1200 along the cross-sectional lines A-A' of FIG. 12, according to another embodiment. The wireless audio accessory 1200 includes an energy source 1400, a wireless data transceiver 1410, a control circuit 1420, a digital audio jack 1430, and an external shell 1440.

The external shell 1440 defines the outer surface of the wireless audio accessory 1200. The external shell 1440 can be made out of various materials, described in this application, such as ceramic and/or metal. The external shell 1440 includes two regions 1450, and 1460. The region 1450 is a region of the external shell 1440 closest to the energy source 1400. The region 1450 is made out of non-ferromagnetic and non-magnetizable material to allow unimpeded power transfer from a device to the energy source 1400. The region 1460 is a region of the external shell 1440 closest to the wireless data transceiver 1410. The region 1460 is made out of non-metallic material to allow unimpeded data transfer between the device and the wireless data transceiver 1410.

The energy source 1400 is a wireless energy source (i.e. a wireless power transfer mechanism), which can be a solenoid receiving induced current from a corresponding solenoid in the device, as described in this application. The energy source 1400 transmits the received energy to the electrical components of the wireless audio accessory 1200. The energy source 1400 can also act as an attachment mechanism between the wireless audio accessory and the device because the energy source 1400 produces a magnetic field while conducting current.

The wireless data transceiver 1410 receives digital audio data from the device, and transmits the digital audio data to the digital audio jack 1430. The digital audio jack 1430 can be a 3.5 mm TRS-TOSLINK jack, supporting stereo audio output using a TRS connector, or TOSLINK (stereo or 5.1 Dolby Digital/DTS) digital output. The wireless audio accessory 1200 can include both the digital audio jack 1430 and the analog audio jack 1360 in FIG. 13.

Figure 15:
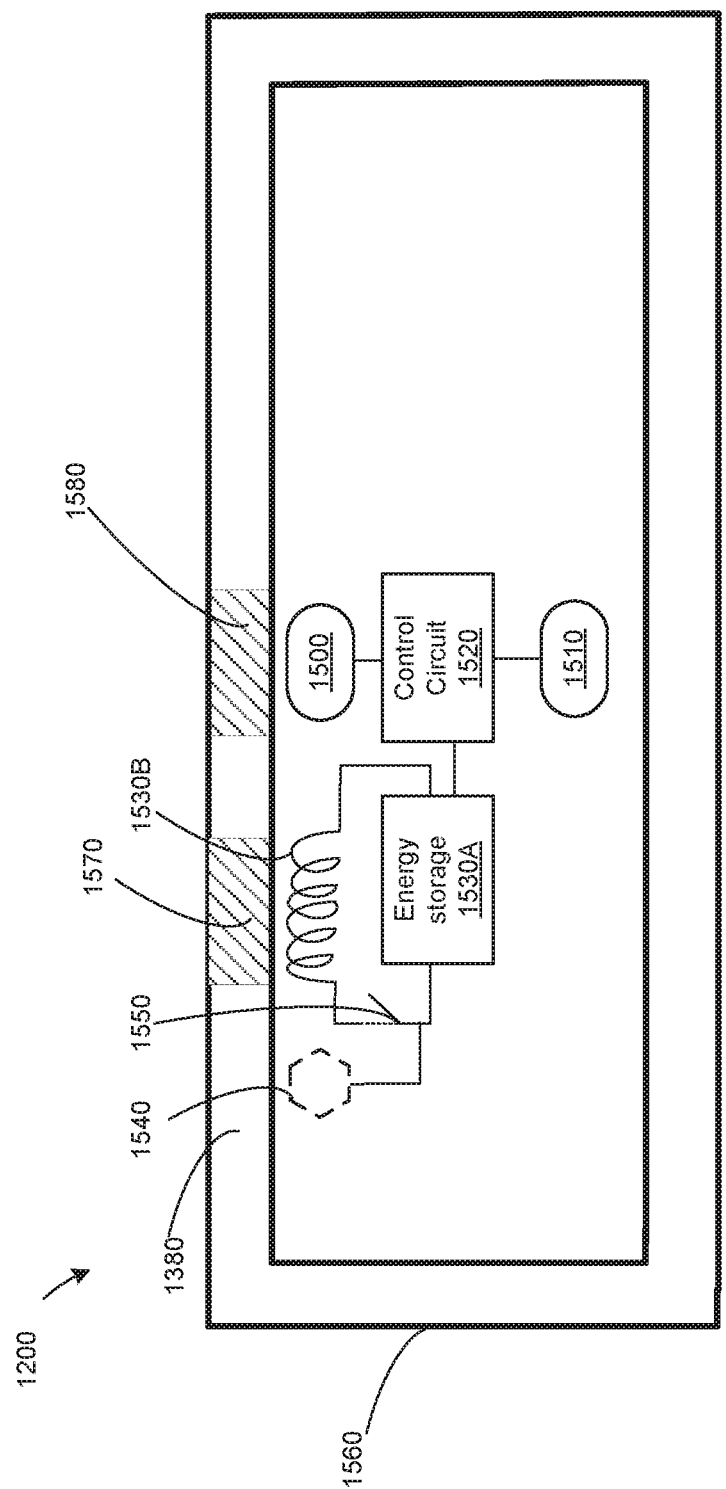
FIG. 15 is a cross-section of the wireless audio accessory 1200 along the cross-sectional lines A-A' of FIG. 12, according to another embodiment.

FIG. 15 is a cross-section of the wireless audio accessory 1200 along the cross-sectional lines A-A' of FIG. 12, according to another embodiment. The wireless audio accessory 1200 includes a first wireless data transceiver 1500, a second wireless data transceiver 1510, a control circuit 1520, an energy source 1530, a sensing switch 1540, a circuit switch 1550, and an external shell 1560.

As described in this application, the external shell 1560 contains two regions 1570, 1580, which are non-ferromagnetic and non-magnetizable, and/or non-metallic, respectively. The region 1570 allows for unimpeded transmission of power, while the region 1580 allows for unimpeded transmission of data.

As described in this application, the first wireless data transceiver 1500 transmits audio data between the wireless audio accessory 1200 and a device. The first wireless data transceiver 1500 transmits the received audio data to the second wireless data transceiver 1510. The second wireless data transceiver 1510 transmits wirelessly the received audio data to a second device, such as an external audio device, or an external audio receiver, etc. The wireless audio accessory 1200 can include the analog audio jack 1360 in FIG. 13, the digital audio jack 1430 in FIG. 14, and the second wireless data transmitter 1510 simultaneously.

The energy source 1530 includes an energy storage 1530A, and a wireless energy source, such as a solenoid 1530B. The energy source 1530 receives energy through the solenoid 1530B from the device. When the sensing switch 1540 detects that the device is proximate to the wireless audio accessory, the sensing switch 1540 closes the circuit switch 1550. The closed circuit switch 1550 enables the electric current induced in the solenoid 1530B to travel to the energy storage 1530A to recharge the energy storage 1530A. Further, the electric current powers the first and second wireless data transceivers 1500, 1510, and the control circuit 1520, thus enabling the transfer of audio data from the device to the second device, the external audio device.

Figure 16:
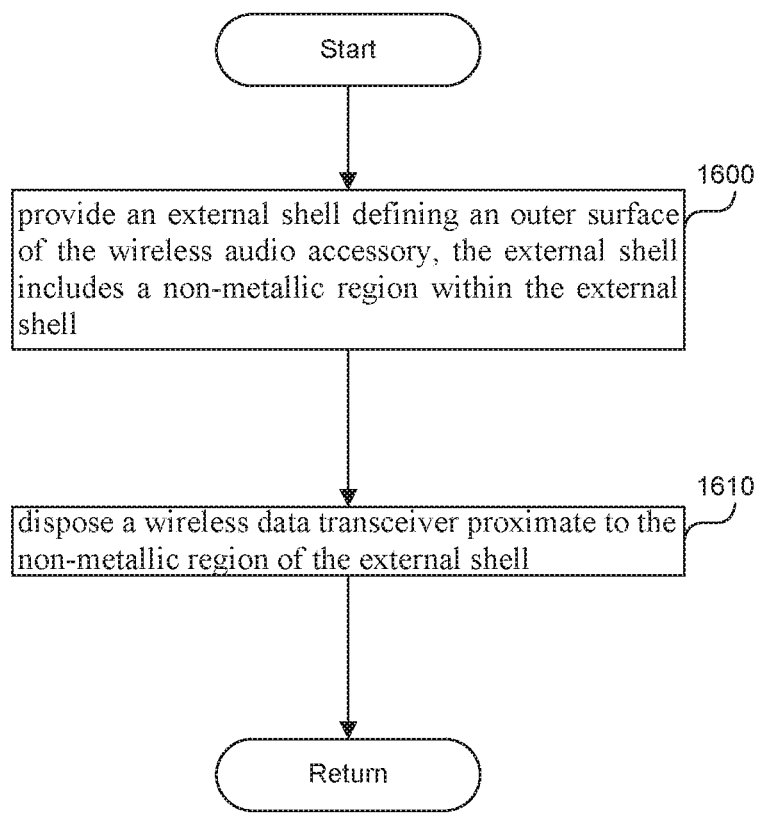
FIG. 16 is a flowchart of a method to manufacture a wireless audio accessory.

FIG. 16 is a flowchart of a method to manufacture a wireless audio accessory. In step 1600, an external shell defining an outer surface of the wireless audio accessory is provided. The external shell includes a non-metallic region within the external shell.

In step 1610, a wireless data transceiver is placed proximate to the non-metallic region of the external shell. The wireless data transceiver can transmit data at extremely high electromagnetic frequencies through the non-metallic region of the external shell between the wireless audio accessory and a device.

An attachment mechanism can be provided within the external shell. The attachment mechanism secures the device proximate to the wireless audio accessory. In one embodiment, providing the attachment mechanism can include enclosing a ferromagnetic material operable to attach to a magnet proximate to the ferromagnetic material. Further, providing the attachment mechanism can include defining a non-ferromagnetic and non-magnetizable region of the external shell proximate to the ferromagnetic material, such that the ferromagnetic material can attach to the magnet through the non-ferromagnetic and non-magnetizable region.

In another embodiment, providing the attachment mechanism includes enclosing a magnet operable to attach to a ferromagnetic material proximate to the magnet. Further, providing the attachment mechanism includes defining a non-ferromagnetic and non-magnetizable region of the external shell proximate to the magnet, such that the magnet can attach to the ferromagnetic material through the non-ferromagnetic and non-magnetizable region.

In addition, the external shell defining an outer surface of the wireless audio accessory includes a non-ferromagnetic and non-magnetizable region within the external shell. An energy source is disposed proximate to the non-ferromagnetic and non-magnetizable region. The energy source can transmit energy through the non-ferromagnetic and non-magnetizable region between the device in proximity to the wireless audio accessory and the wireless audio accessory.

In one embodiment, disposing the energy source can include disposing an energy storage within the external shell, and disposing a plurality of connectors connected to the energy storage proximate to the non-metallic region. The plurality of connectors can transmit energy when in contact with a plurality of connectors of the device.

In another embodiment, disposing the energy source can include disposing an energy storage within the external shell, and disposing a wireless energy source coupled to the energy storage. The wireless energy source is proximate to the non-ferromagnetic and non-magnetizable region, and can wirelessly receive energy from the device via induced electrical current flow.

In yet another embodiment, a sensing switch can be coupled to the energy source. The sensing switch can detect when the device is proximate to the wireless audio accessory and can activate the energy source. In this embodiment, disposing the energy source can include configuring an energy storage to release energy when the sensing switch activates the energy source, and configuring a plurality of connectors connected to the energy storage to transmit energy when in contact with a plurality of connectors of the device.

Computer

Figure 17:
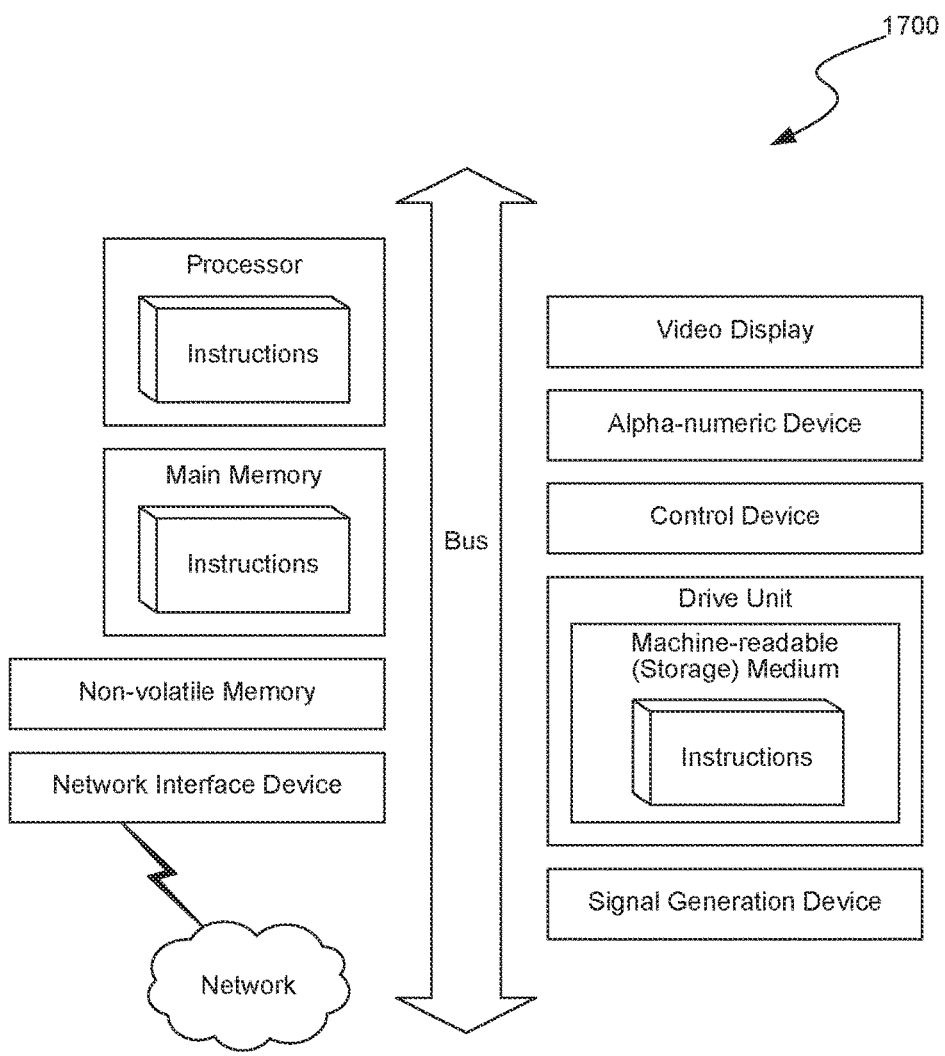
FIG. 17 is a diagrammatic representation of a machine in the example form of a computer system within which a set of instructions, for causing the machine to perform any one or more of the methodologies or modules discussed herein, may be executed.

FIG. 17 is a diagrammatic representation of a machine in the example form of a computer system 1700 within which a set of instructions, for causing the machine to perform any one or more of the methodologies or modules discussed herein, may be executed.

In the example of FIG. 17, the computer system 1700 includes a processor, memory, non-volatile memory, and an interface device. Various common components (e.g., cache memory) are omitted for illustrative simplicity. The computer system 1700 is intended to illustrate a hardware device on which any of the components described in the example of FIGS. 1-16 (and any other components described in this specification) can be implemented. The computer system 1700 can be of any applicable known or convenient type. The components of the computer system 1700 can be coupled together via a bus or through some other known or convenient device.

The computer system 1700 can be the device 100. The processor of the device 100 can correspond to the processor of the computer system 1700, the display of the device 100 can correspond to the video display of the computer system 1700, the wireless data transceiver of the device 100 can correspond to the signal generation device of the computer system 1700, etc. Further, parts of the computer system 1700 can correspond to the parts of the wireless audio accessory. The control circuit of the device accessory can correspond to the processor of the computer system 1700, the wireless data transceiver of the external computing system can correspond to the signal generation device of the computer system 1700, etc.

This disclosure contemplates the computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1700 may include one or more computer systems 1700; be unitary or distributed; span multiple locations; span multiple machines; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1700. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 17 reside in the interface.

In operation, the computer system 1700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The invention claimed is:

1. A device comprising:
   an external shell defining an outer surface of the device, the external shell comprising a non-metallic region;
   a wireless data transceiver enclosed by the external shell and disposed proximate to the non-metallic region of the external shell, the wireless data transceiver transmitting data through the non-metallic region of the external shell at extremely high electromagnetic frequencies between the device and a device accessory;
   a sensing switch, enclosed by the external shell, detecting when the device accessory is proximate to the device and, responsive thereto, activating an energy source; and
   an attachment mechanism, enclosed by the external shell, securing the device accessory proximate to the device, the attachment mechanism including the energy source enclosed by the external shell, the energy source transferring energy between the device accessory and the device, the energy source surrounding the wireless data transceiver, when the energy source engages with an energy source of the device accessory the attachment mechanism aligning the wireless data transceiver of the device and a wireless data transceiver of the device accessory to communicate substantially perpendicularly through the external shell and enabling communication at the extremely high electromagnetic frequencies comprising 30 GHz to 300 GHz, by minimizing scattering of the extremely high electromagnetic frequencies traveling through the non-metallic region of the external shell, the attachment mechanism activating the sensing switch when the device accessory is secured to the device.

2. The device of claim 1, the attachment mechanism comprising a ferromagnetic material enclosed within the external shell, the ferromagnetic material proximate to a non-ferromagnetic and non-magnetizable region of the external shell, the ferromagnetic material attaching to a magnet placed proximate to the ferromagnetic material.

3. The device of claim 2, the sensing switch detecting a magnetic field of the device accessory and, responsive thereto, activating the energy source.

4. A device comprising:
an external shell defining an outer surface of the device, the external shell comprising a non-metallic region;
a wireless data transceiver enclosed by the external shell and disposed proximate to the non-metallic region of the external shell, the wireless data transceiver transmitting data through the non-metallic region of the external shell at electromagnetic frequencies between the device and a device accessory; and
an attachment mechanism holding the device accessory proximate to the device, the attachment mechanism including an energy source surrounding the wireless data transceiver, when the energy source engages with an energy source of the device accessory the attachment mechanism aligning the wireless data transceiver of the device and a wireless data transceiver of the device accessory to communicate substantially perpendicularly through the external shell and enabling communication at extremely high electromagnetic frequencies comprising 30 GHz to 300 GHz, by minimizing scattering of the extremely high electromagnetic frequencies traveling through the non-metallic region of the external shell.

5. The device of claim 4, the attachment mechanism comprising:
a ferromagnetic material, enclosed within the external shell, proximate to a non-ferromagnetic and non-magnetizable region of the external shell, the ferromagnetic material attaching to a magnet placed proximate to the ferromagnetic material.

6. The device of claim 4, the attachment mechanism comprising:
a magnet, enclosed within the external shell, proximate to a non-ferromagnetic and non-magnetizable region of the external shell, the magnet attaching to a ferromagnetic material placed proximate to the magnet.

7. The device of claim 4, comprising:
the energy source enclosed by the external shell and disposed proximate to a second non-metallic region of the external shell, the energy source transferring energy between the device accessory and the device through the second non-metallic region.

8. The device of claim 7, the energy source comprising:
an energy storage; and
a plurality of connectors connected to the energy storage, the plurality of connectors transferring energy when in contact with a plurality of connectors of the device accessory.

9. The device of claim 7, the energy source comprising:
an energy storage producing varying electrical current; and
a wireless power transfer mechanism connected to the energy storage and wirelessly transferring energy to the device accessory by inducing electrical current flow in a wireless power transfer mechanism of the device accessory.

10. The device of claim 7, comprising a sensing switch detecting when the device accessory is proximate to the device and responsive thereto activating the energy source.

11. The device of claim 10, the sensing switch comprising at least one of a Hall effect sensor, a proximity sensor, or a touch sensor.

12. The device of claim 10, the energy source comprising:
an energy storage releasing energy when the sensing switch activates the energy source; and
a plurality of connectors connected to the energy storage, the plurality of connectors transferring energy when in contact with a plurality of connectors of the device accessory.

13. The device of claim 10, the energy source comprising:
an energy storage producing varying electrical current, and releasing energy when the sensing switch activates the energy source; and
a solenoid, connected to the energy storage, wirelessly transferring energy to the device accessory by inducing electrical current flow in a solenoid of the device accessory.

14. The device of claim 10, the energy source comprising:
a circuit switch coupled to the sensing switch, the circuit switch enabling energy transfer when the sensing switch detects the device accessory is proximate to the device.

15. A device accessory comprising:
an external shell defining an outer surface of the device accessory, the external shell comprising a non-metallic region, and a non-ferromagnetic and non-magnetizable region;
a wireless data transceiver enclosed by the external shell and disposed proximate to the non-metallic region of the external shell, the wireless data transceiver transmitting data through the non-metallic region of the external shell at electromagnetic frequencies between the device accessory and a device;
an energy source enclosed by the external shell and disposed proximate to the non-ferromagnetic and non-magnetizable region of the external shell, the energy source transferring energy through the non-ferromagnetic and non-magnetizable region of the external shell between the device accessory and the device; and
an attachment mechanism enclosed by the external shell, securing the device accessory proximate to the device, the attachment mechanism including the energy source surrounding the wireless data transceiver, when the energy source engages with an energy source of the device the attachment mechanism aligning the wireless data transceiver of the device accessory and a wireless data transceiver of the device to communicate substantially perpendicularly through the external shell and enabling communication at extremely high electromagnetic frequencies comprising 30 GHz to 300 GHz, by minimizing scattering of the extremely high electromagnetic frequencies traveling through the non-metallic region of the external shell.

16. The device accessory of claim 15, the attachment mechanism comprising a magnet enclosed within the external shell, the magnet proximate to the non-ferromagnetic and non-magnetizable region of the external shell, the magnet attaching to a ferromagnetic material proximate to the magnet.

17. The device accessory of claim 15, the energy source comprising:
a wireless power transfer mechanism wirelessly receiving energy from the device, the wireless power transfer mechanism providing power to the wireless data transceiver.

18. A method to manufacture a device comprising:
providing an external shell defining an outer surface of the device, said providing the external shell comprising providing a non-metallic region within the external shell;
disposing a wireless data transceiver proximate to the non-metallic region of the external shell, the wireless data transceiver to transmit data through the non-metallic region of the external shell at extremely high electromagnetic frequencies between the device and a device accessory; and
providing an attachment mechanism within the external shell, the attachment mechanism to hold the device accessory proximate to the device, the attachment mechanism including an energy source enclosed by the external shell, the energy source to transfer energy between the device accessory and the device, the energy source surrounding the wireless data transceiver, when the energy source engages with an energy source of the device accessory the attachment mechanism to align the wireless data transceiver of the device and a wireless data transceiver of the device accessory enabling substantially perpendicular communication through the external shell and to enable communication at the extremely high electromagnetic frequencies comprising 30 GHz to 300 GHz, by minimizing scattering of the extremely high electromagnetic frequencies traveling through the non-metallic region of the external shell.

19. The method of claim 18, said providing the attachment mechanism comprising:
enclosing a ferromagnetic material to attach to a magnet proximate to the ferromagnetic material; and
defining a non-ferromagnetic and non-magnetizable region of the external shell proximate to the ferromagnetic material, such that the ferromagnetic material can attach to the magnet through the non-ferromagnetic and non-magnetizable region.

20. The method of claim 18, said providing the attachment mechanism comprising:
enclosing a magnet to attach to a ferromagnetic material proximate to the magnet;
defining a non-ferromagnetic and non-magnetizable region of the external shell proximate to the magnet, such that the magnet can attach to the ferromagnetic material through the non-ferromagnetic and non-magnetizable region.

21. The method of claim 18, comprising:
providing the external shell defining the outer surface of the device, said providing the external shell comprising providing a non-ferromagnetic and non-magnetizable region within the external shell; and
disposing the energy source proximate to the non-ferromagnetic and non-magnetizable region, the energy source to transfer energy through the non-ferromagnetic and non-magnetizable region between the device accessory and the device.

22. The method of claim 21, said disposing the energy source comprising:
disposing an energy storage within the external shell; and
disposing a plurality of connectors connected to the energy storage proximate to the non-metallic region, the plurality of connectors to transfer energy when in contact with a plurality of connectors of the device accessory.

23. The method of claim 21, said disposing the energy source comprising:
disposing an energy storage within the external shell;
configuring the energy storage to produce varying electrical current; and
disposing a wireless power transfer mechanism coupled to the energy storage proximate the non-ferromagnetic and non-magnetizable region, the wireless power transfer mechanism to wirelessly transfer energy to the device accessory by inducing electrical current flow in a wireless power transfer mechanism of the device accessory.

24. The method of claim 21, comprising coupling a sensing switch to the energy source, the sensing switch to detect when the device accessory is proximate to the device and to activate the energy source.

25. The device of claim 24, said disposing the energy source comprising:
configuring an energy storage to release energy when the sensing switch activates the energy source; and
configuring a plurality of connectors connected to the energy storage to transfer energy when in contact with a plurality of connectors of the device accessory.

26. The method of claim 24, said disposing the energy source comprising:
configuring an energy storage to produce varying electrical current, and to release energy when the sensing switch activates the energy source; and
configuring a solenoid connected to the energy storage, the solenoid to wirelessly transfer energy to the device accessory by inducing electrical current flow in a solenoid of the device accessory.

27. A device comprising:
an external shell defining an outer surface of the device, the external shell comprising a non-metallic region;
a wireless data transceiver enclosed by the external shell and disposed proximate to the non-metallic region of the external shell, the wireless data transceiver transmitting data through the non-metallic region of the external shell at extremely high electromagnetic frequencies between the device and a device accessory; and
an attachment mechanism holding the device accessory proximate to the device, the attachment mechanism including an energy source surrounding the wireless data transceiver, when the energy source engages with an energy source of the device accessory the attachment mechanism aligning the wireless data transceiver of the device and a wireless data transceiver of the device accessory to communicate substantially perpendicularly through the external shell and enabling communication at the extremely high electromagnetic frequencies comprising 30 GHz to 300 GHz.

* * * * *